United States Patent
Shimada et al.

(10) Patent No.: US 10,974,648 B2
(45) Date of Patent: Apr. 13, 2021

(54) VEHICLE DRIVE ASSIST SYSTEM

(71) Applicant: HONDA MOTOR CO., LTD., Tokyo (JP)

(72) Inventors: Masahiko Shimada, Wako (JP); Toshinori Saiki, Wako (JP); Hiroaki Hakukawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 16/425,982

(22) Filed: May 30, 2019

(65) Prior Publication Data

US 2019/0389377 A1 Dec. 26, 2019

(30) Foreign Application Priority Data

Jun. 26, 2018 (JP) .............................. JP2018-121126

(51) Int. Cl.
*B60Q 9/00* (2006.01)
*B60R 1/12* (2006.01)
*B60Q 1/40* (2006.01)

(52) U.S. Cl.
CPC ................ *B60Q 9/00* (2013.01); *B60Q 1/40* (2013.01); *B60R 1/12* (2013.01); *B60R 2001/1215* (2013.01)

(58) Field of Classification Search
CPC .......... B60Q 9/00; B60Q 1/40; B60Q 1/2665; B60Q 9/008; B60Q 1/1469; B60Q 1/42;

(Continued)

(56) References Cited

U.S. PATENT DOCUMENTS 3,328,757 A * 6/1967 Buechler ................ B60Q 1/425
                                                                                340/458
3,555,506 A * 1/1971 Daws ....................... B60Q 1/40
                                                                                340/477

(Continued)

FOREIGN PATENT DOCUMENTS

JP        2006-117047        5/2006
JP        2012-096708        5/2012

(Continued)

OTHER PUBLICATIONS

Japanese Office Action for Japanese Patent Application No. 2018-121126 dated Jan. 7, 2020.

*Primary Examiner* — Ryan W Sherwin
(74) *Attorney, Agent, or Firm* — Amin, Turocy & Watson, LLP

(57) ABSTRACT

A vehicle drive assist system includes: an operation part that is operable from a neutral position to a first position at one side or a second position at another side; a switch part that outputs an ON signal or an OFF signal in accordance with a position of the operation part; a control part that generates a turn signal in response to an output of the switch part; a detection part that detects a rear side situation of a vehicle; and an alert part that performs an alert based on an output of the ON signal of the switch part and a detection result of the detection part, wherein in a case where an operation to the second position is performed when the turn signal in accordance with an operation to the first position is generated or in a case where an operation to the second position is performed after the turn signal in accordance with an operation to the first position is generated, a control that performs only a visual alert is performed.

8 Claims, 11 Drawing Sheets

(58) Field of Classification Search
CPC .. B60Q 1/34; B60Q 1/346; B60R 1/12; B60R 2001/1215
See application file for complete search history.

(56) References Cited

U.S. PATENT DOCUMENTS

| | | | | |
|---|---|---|---|---|
| 4,030,066 | A * | 6/1977 | White | B60Q 1/40 340/476 |
| 4,058,797 | A * | 11/1977 | Sekiguchi | B60Q 1/343 340/477 |
| 4,333,071 | A * | 6/1982 | Kira | B60Q 1/40 200/61.31 |
| 4,384,270 | A * | 5/1983 | Morita | B60Q 1/40 200/61.27 |
| 4,907,844 | A * | 3/1990 | White | B60Q 1/36 340/457 |
| 5,414,407 | A * | 5/1995 | Gerrans | B60Q 1/38 340/457 |
| 5,486,809 | A * | 1/1996 | Wadlington, Jr. | B60Q 1/40 200/61.27 |
| 5,581,235 | A * | 12/1996 | Hollstein | B60Q 1/38 340/475 |
| 5,646,590 | A * | 7/1997 | Dembicks | B60Q 1/34 340/326 |
| 5,790,017 | A * | 8/1998 | Berryhill | B60Q 1/38 340/474 |
| 5,949,040 | A * | 9/1999 | Hayakawa | B60Q 1/425 200/61.3 |
| 6,876,300 | B2 * | 4/2005 | Ponziani | B60Q 1/346 162/36 |
| 7,783,399 | B1 * | 8/2010 | Young | B60Q 1/40 701/36 |
| 8,164,430 | B2 * | 4/2012 | Nagamine | G08G 1/166 340/425.5 |
| 10,504,369 | B2 * | 12/2019 | Kodama | B60Q 1/525 |
| 2002/0024434 | A1 * | 2/2002 | Okuda | B60Q 1/40 340/476 |
| 2004/0060805 | A1 * | 4/2004 | Otani | B60Q 1/1469 200/16 D |
| 2004/0090318 | A1 * | 5/2004 | Rothkop | B60Q 9/008 340/435 |
| 2004/0233051 | A1 * | 11/2004 | Madau | B60Q 1/40 340/476 |
| 2005/0267671 | A1 * | 12/2005 | Matsumoto | B60Q 9/008 701/117 |
| 2006/0164226 | A1 * | 7/2006 | Hartle | B60Q 9/00 340/457 |
| 2006/0187016 | A1 * | 8/2006 | Tsukida | B60Q 1/40 340/476 |
| 2008/0121500 | A1 * | 5/2008 | Matsumura | B60Q 1/1469 200/61.54 |
| 2008/0164991 | A1 * | 7/2008 | Shimizu | B60Q 1/40 340/476 |
| 2010/0156621 | A1 * | 6/2010 | Nishimura | B60Q 1/42 340/476 |
| 2010/0308988 | A1 * | 12/2010 | Ieda | B60Q 1/40 340/477 |
| 2013/0010484 | A1 * | 1/2013 | Son | B60Q 1/525 362/464 |
| 2014/0022070 | A1 * | 1/2014 | Golomb | B60Q 1/40 340/475 |
| 2015/0022336 | A1 * | 1/2015 | Mueller | B60R 1/00 340/477 |
| 2015/0035669 | A1 * | 2/2015 | Scheck | B60Q 1/34 340/476 |
| 2015/0075954 | A1 * | 3/2015 | Mizuno | B60Q 1/343 200/61.3 |
| 2015/0336505 | A1 * | 11/2015 | Suzuki | B60Q 1/40 340/476 |
| 2016/0016508 | A1 * | 1/2016 | Hoskins | G08G 1/166 340/476 |
| 2016/0114722 | A1 * | 4/2016 | Kim | B60Q 1/46 701/36 |
| 2017/0057404 | A1 * | 3/2017 | Park | B60Q 1/346 |
| 2017/0166114 | A1 * | 6/2017 | Kim | B60Q 1/42 |
| 2017/0267165 | A1 * | 9/2017 | Noguchi | B60Q 1/42 |
| 2018/0072326 | A1 * | 3/2018 | Ichikawa | B60W 30/182 |
| 2018/0147984 | A1 * | 5/2018 | Himi | B62D 15/0255 |
| 2018/0304802 | A1 * | 10/2018 | Choi | B60Q 1/38 |
| 2019/0389377 | A1 * | 12/2019 | Shimada | B60R 1/12 |
| 2020/0130567 | A1 * | 4/2020 | Taniguchi | B60W 30/12 |

FOREIGN PATENT DOCUMENTS

| | | |
|---|---|---|
| JP | 2016-043805 | 4/2016 |
| JP | 2018-088055 | 6/2018 |

* cited by examiner

VEHICLE DRIVE ASSIST SYSTEM

CROSS-REFERENCE TO RELATED APPLICATION

Priority is claimed on Japanese Patent Application No. 2018-121126, filed on Jun. 26, 2018, the contents of which are incorporated herein by reference.

BACKGROUND

Field of the Invention

The present invention relates to a vehicle drive assist system.

Background

In the related art, a turn direction command device that facilitates an operation is known (for example, refer to Japanese Patent Application, Publication No. 2006-117047A). In the turn direction command device, a lever is formed such that, when performing a swing operation of the lever, the lever automatically returns to a neutral position, and by a control means outputting a drive signal to a lighting device for a predetermined period of time, in a case such as a lane change where a rotation operation angle of a handle is small, a turn signal lamp is blinked for a predetermined period of time.

Further, in the related art, a turn signal lighting control device aimed at ensuring an accurate lighting operation in accordance with a user's intention is known (for example, refer to Japanese Patent Application, Publication No. 2012-096708A). In the turn signal lighting control device, when a momentary turn lever is operated, a turn signal on an operated side of right and left turn signals is turned on, when a turn-off condition of the turn signal which is lighting is satisfied, the turn signal is turned off, and when the turn signal is automatically turned off, for a predetermined period of time from this point of time, a turn-on operation by the operation of the turn lever is inhibited.

Japanese Patent Application, Publication No. 2006-117047A and Japanese Patent Application, Publication No. 2012-096708A do not disclose that an alert to a driver and the like is performed in response to a rear side situation of a vehicle and the like.

For example, in a case where a swing operation of the lever of a right turn direction is required in order to release the blinking of the turn signal lamp of a left turn direction, if an auditory and/or tactile alert is performed in response to a right rear situation of the vehicle although a driver does not intend a rightward lane change, there is a possibility that the driver or the like may feel uncomfortable.

Further, for example, there may be a case in which a driver who intends to move the lever back to a neutral position in order to release the blinking of the turn signal lamp of the left turn direction erroneously operates the lever to an operation position of the right turn direction although the driver does not intend a rightward lane change. In this case, when an auditory and/or tactile alert is performed in response to a right rear situation of the vehicle, there is a possibility that the driver or the like may feel uncomfortable similarly to the case described above.

SUMMARY

An aspect of the present invention provides a vehicle drive assist system capable of reducing a possibility that an auditory and/or tactile alert which is not wished by a driver or the like is performed.

(1) A vehicle drive assist system according to an aspect of the present invention includes: an operation part that is provided operable from a neutral position to a first position at one side and a second position at another side and that returns to the neutral position after being operated or after a predetermined condition is satisfied; a switch part that outputs any one of an ON signal and an OFF signal in accordance with a position of the operation part; a control part that generates a turn signal in response to an output of the switch part; a detection part that detects a rear side situation of a vehicle; and an alert part that performs an alert based on an output of the ON signal of the switch part and a detection result of the detection part, wherein the alert part includes a visual alert part, and an auditory alert part and/or a tactile alert part, the control part performs at least one of a one touch turn control that generates a turn signal over a first setting period and a full turn control that continuously generates a turn signal until the predetermined condition is satisfied, and at least one of: a first control in which, in a case where the switch part outputs the ON signal in accordance with the second position in the one touch turn control in accordance with the first position, the control part does not generate the turn signal in accordance with the second position and cancels the one touch turn control in accordance with the first position, and only the visual alert part of the alert part performs a visual alert based on the output of the ON signal in accordance with the second position and the detection result of the detection part; and a second control in which, in a case where the switch part outputs the ON signal in accordance with the second position when or after the control part generates a full turn signal in accordance with the first position, the control part does not generate the turn signal in accordance with the second position and cancels the full turn control in accordance with the first position, and only the visual alert part of the alert part performs a visual alert based on the output of the ON signal in accordance with the second position and the detection result of the detection part is performed.

(2) In the above vehicle drive assist system described in (1), the visual alert part may include a first display portion that is provided on a side mirror of the vehicle and/or a second display portion that is provided at a position away from a vehicle width direction position of a steering.

(3) In the above vehicle drive assist system described in (1) or (2), the control part may set a second setting period when the first control is started, and in a case where the output of the ON signal in accordance with the second position continues after the second setting period elapses, the control part may generate the turn signal in accordance with the second position, and the auditory alert part and/or the tactile alert part may perform an auditory and/or tactile alert based on the output of the ON signal in accordance with the second position and the detection result of the detection part.

(4) In the above vehicle drive assist system described in (3), in a case where, in the second setting period, after being operated to return to the neutral position, the operation part is operated to the second position again, the first control may generate the turn signal in accordance with the second position before the second setting period elapses and may allow the auditory alert part and/or the tactile alert part to perform an auditory and/or tactile alert based on the output of the ON signal in accordance with the second position of the operation part and the detection result of the detection part.

(5) In the above vehicle drive assist system described in any of (1) to (4), the control part may set a third setting period when the second control is started, and in a case where the output of the ON signal in accordance with the second position occurs after the third setting period elapses, the control part may generate the turn signal in accordance with the second position, and the auditory alert part and/or the tactile alert part may perform an auditory and/or tactile alert based on the output of the ON signal in accordance with the second position and the detection result of the detection part.

(6) In the above vehicle drive assist system described in (4), in a case where, in the third setting period, after being operated to return to the neutral position, the operation part is operated to the second position again, the second control may generate the turn signal in accordance with the second position before the third setting period elapses and may allow the auditory alert part and/or the tactile alert part to perform an auditory and/or tactile alert based on the output of the ON signal in accordance with the second position of the operation part and the detection result of the detection part.

(7) In the above vehicle drive assist system described in (3), in a case where the output of the ON signal in accordance with the second position continues after the second setting period elapses, the control part may generate a signal that operates a cornering light to emit light in a side direction which corresponds to the turn signal in accordance with the second position among right and left side directions of the vehicle.

(8) In the above vehicle drive assist system described in (5), in a case where the output of the ON signal in accordance with the second position continues after the third setting period elapses, the control part may generate a signal that operates a cornering light to emit light in a side direction which corresponds to the turn signal in accordance with the second position among right and left side directions of the vehicle.

The case where the switch part outputs the ON signal in accordance with the second position of the operation part in the one touch turn control in accordance with the first position of the operation part includes a case where, for example, the driver of the vehicle intends to release the turn signal in accordance with the first position of the operation part and does not intend to generate the turn signal in accordance with the second position of the operation part and where, for example, the driver of the vehicle does not wish an auditory and/or tactile alert.

Therefore, in the above vehicle drive assist system described in (1), in such a case, the auditory alert part and/or the tactile alert part of the alert part do not perform an auditory and/or tactile alert.

Therefore, in the above vehicle drive assist system described in (1), for example, it is possible to reduce a possibility that the auditory and/or tactile alert is performed when the driver of the vehicle does not wish (for example, in a case where merely cancellation of the one touch turn is wished or the like).

On the other hand, in the above vehicle drive assist system described in (1), for example, since an alert of a visual method is promptly performed with respect to the driver of the vehicle who wishes a lane change to another side, it is possible to improve the safety. Since the driver who wishes a lane change has an increased attention compared to a case of ordinary travel, it is possible to sufficiently improve the safety even when the alert includes only the visual alert.

That is, in the above vehicle drive assist system described in (1), it is possible to achieve both reduction of a feeling of unpleasantness given to the driver who does not wish a lane change and improvement of the safety with respect to the driver who wishes a lane change.

Further, the case where the switch part outputs the ON signal in accordance with the second position of the operation part when or after the control part generates the full turn signal in accordance with the first position of the operation part includes a case where, for example, the driver of the vehicle who intends to release the turn signal in accordance with the first position of the operation part erroneously operates the operation part to the second position although there is no intention to generate the turn signal in accordance with the second position of the operation part.

Therefore, in the above vehicle drive assist system described in (1), in such a case, the auditory alert part and/or the tactile alert part of the alert part do not perform an auditory and/or tactile alert.

Therefore, in the above vehicle drive assist system described in (1), for example, it is possible to reduce a possibility that the auditory and/or tactile alert is performed when the driver of the vehicle erroneously operates the operation part. That is, for example, it is possible to reduce a possibility that the auditory and/or tactile alert is performed when the driver of the vehicle does not wish.

On the other hand, in the above vehicle drive assist system described in (1), for example, since an alert of a visual method is promptly performed with respect to the driver of the vehicle who wishes a lane change to another side, it is possible to improve the safety. Since the driver who wishes a lane change has an increased attention compared to a case of ordinary travel, it is possible to sufficiently improve the safety even when the alert includes only the visual alert.

That is, in the above vehicle drive assist system described in (1), it is possible to achieve both reduction of a feeling of unpleasantness given to the driver who does not wish a lane change and improvement of the safety with respect to the driver who wishes a lane change.

In the above vehicle drive assist system described in (2), the visual alert part may include the first display portion that is provided on the side mirror of the vehicle and/or the second display portion that is provided at a position away from a vehicle width direction position of the steering.

When the visual alert part includes the first display portion and/or the second display portion, in the above vehicle drive assist system described in (2), it is possible to reduce a possibility that the driver has a feeling of unpleasantness compared to a case where the visual alert part that is provided at a vehicle width direction position of the steering performs the visual alert. On the other hand, since the driver who wishes a lane change has an increased attention compared to a case of ordinary travel, it is possible to sufficiently improve the safety even by the visual alert to the side mirror and/or the position away from the vehicle width direction position of the steering.

In a case where the switch part continues outputting the ON signal in accordance with the second position of the operation part, or in a case where, in the second setting period, after being operated to return to the neutral position, the operation part is operated to the second position again, for example, it can be estimated that the driver of the vehicle not only intends to release the turn signal in accordance with the first position of the operation part but also intends to generate the turn signal in accordance with the second position of the operation part.

Therefore, in the above vehicle drive assist system described in (3), after the second setting period elapses, the control part may generate the turn signal in accordance with the second position of the operation part, and the auditory alert part and/or the tactile alert part may perform an auditory and/or tactile alert based on the output of the ON signal in accordance with the second position of the operation part and the detection result of the detection part.

When the control part generates the turn signal in accordance with the second position of the operation part after the second setting period elapses, in the above vehicle drive assist system described in (3), it is possible to satisfy the request of the driver of the vehicle, for example, who intends to generate the turn signal in accordance with the second position of the operation part.

Further, when the auditory alert part and/or the tactile alert part perform the auditory and/or tactile alert after the second setting period elapses, in the above vehicle drive assist system described in (3), it is possible to improve the safety compared to a case where the auditory and/or tactile alert is not performed after the second setting period elapses.

Further, in the above vehicle drive assist system described in (4), in a case where, in the second setting period, after being operated to return to the neutral position, the operation part is operated to the second position again, the first control may generate the turn signal in accordance with the second position before the second setting period elapses and may allow the auditory alert part and/or the tactile alert part to perform an auditory and/or tactile alert based on the output of the ON signal in accordance with the second position of the operation part and the detection result of the detection part.

When the first control generates the turn signal in accordance with the second position before the second setting period elapses, in the above vehicle drive assist system described in (4), it is possible to satisfy the request of the driver of the vehicle, for example, who intends to generate the turn signal in accordance with the second position of the operation part.

Further, when the auditory alert part and/or the tactile alert part perform the auditory and/or tactile alert before the second setting period elapses, in the above vehicle drive assist system described in (4), it is possible to improve the safety compared to a case where the auditory and/or tactile alert is not performed before the second setting period elapses.

In a case where the switch part continues outputting the ON signal in accordance with the second position of the operation part, or in a case where, in the third setting period, after being operated to return to the neutral position, the operation part is operated to the second position again, it can be estimated not that, for example, the operation part is positioned at the second position due to an erroneous operation of the driver of the vehicle but that, for example, the driver of the vehicle intends to generate the turn signal in accordance with the second position of the operation part.

Therefore, in the above vehicle drive assist system described in (5), after the third setting period elapses, the control part may generate the turn signal in accordance with the second position of the operation part, and the auditory alert part and/or the tactile alert part may perform an auditory and/or tactile alert based on the output of the ON signal in accordance with the second position of the operation part and the detection result of the detection part.

When the control part generates the turn signal in accordance with the second position of the operation part after the third setting period elapses, in the above vehicle drive assist system described in (5), it is possible to satisfy the request of the driver of the vehicle, for example, who intends to generate the turn signal in accordance with the second position of the operation part.

Further, when the auditory alert part and/or the tactile alert part perform the auditory and/or tactile alert after the third setting period elapses, in the above vehicle drive assist system described in (5), it is possible to improve the safety compared to a case where the auditory and/or tactile alert is not performed after the third setting period elapses.

Further, in the above vehicle drive assist system described in (6), in a case where, in the third setting period, after being operated to return to the neutral position, the operation part is operated to the second position again, the second control may generate the turn signal in accordance with the second position before the third setting period elapses and may allow the auditory alert part and/or the tactile alert part to perform an auditory and/or tactile alert based on the output of the ON signal in accordance with the second position of the operation part and the detection result of the detection part.

When the second control generates the turn signal in accordance with the second position before the third setting period elapses, in the above vehicle drive assist system described in (6), it is possible to satisfy the request of the driver of the vehicle, for example, who intends to generate the turn signal in accordance with the second position of the operation part.

Further, when the auditory alert part and/or the tactile alert part perform the auditory and/or tactile alert before the third setting period elapses, in the above vehicle drive assist system described in (6), it is possible to improve the safety compared to a case where the auditory and/or tactile alert is not performed before the third setting period elapses.

As described above, in a case where the switch part continues outputting the ON signal in accordance with the second position of the operation part, for example, it can be estimated that the driver of the vehicle not only intends to release the turn signal in accordance with the first position of the operation part but also intends to generate the turn signal in accordance with the second position of the operation part.

Therefore, in the above vehicle drive assist system described in (7), after the second setting period elapses, the control part may generate a signal that operates the cornering light to emit light in a lateral direction that corresponds to the turn signal in accordance with the second position of the operation part among right and left lateral directions of the vehicle.

When the control part generates the signal that operates the cornering light to emit light in the vehicle lateral direction that corresponds to the turn signal in accordance with the second position of the operation part after the second setting period elapses, in the above vehicle drive assist system described in (7), it is possible to improve the safety compared to a case where light is not emitted in the vehicle lateral direction that corresponds to the turn signal in accordance with the second position of the operation part after the second setting period elapses.

As described above, in a case where the switch part continues outputting the ON signal in accordance with the second position of the operation part, it can be estimated not that, for example, the operation part is positioned at the second position due to an erroneous operation of the driver of the vehicle but that, for example, the driver of the vehicle intends to generate the turn signal in accordance with the second position of the operation part.

Therefore, in the above vehicle drive assist system described in (8), after the third setting period elapses, the control part may generate a signal that operates the cornering light to emit light in a lateral direction that corresponds to the turn signal in accordance with the second position of the operation part among right and left lateral directions of the vehicle.

When the control part generates the signal that operates the cornering light to emit light in the vehicle lateral direction that corresponds to the turn signal in accordance with the second position of the operation part after the third setting period elapses, in the above vehicle drive assist system described in (8), it is possible to improve the safety compared to a case where light is not emitted in the vehicle lateral direction that corresponds to the turn signal in accordance with the second position of the operation part after the third setting period elapses.

BRIEF DESCRIPTION OF THE DRAWINGS

FIG. 8 is a view showing an arrangement of a display portion and the like.

DESCRIPTION OF THE EMBODIMENTS

Hereinafter, embodiments of a vehicle drive assist system of the present invention will be described with reference to the drawings.

Figure 1:
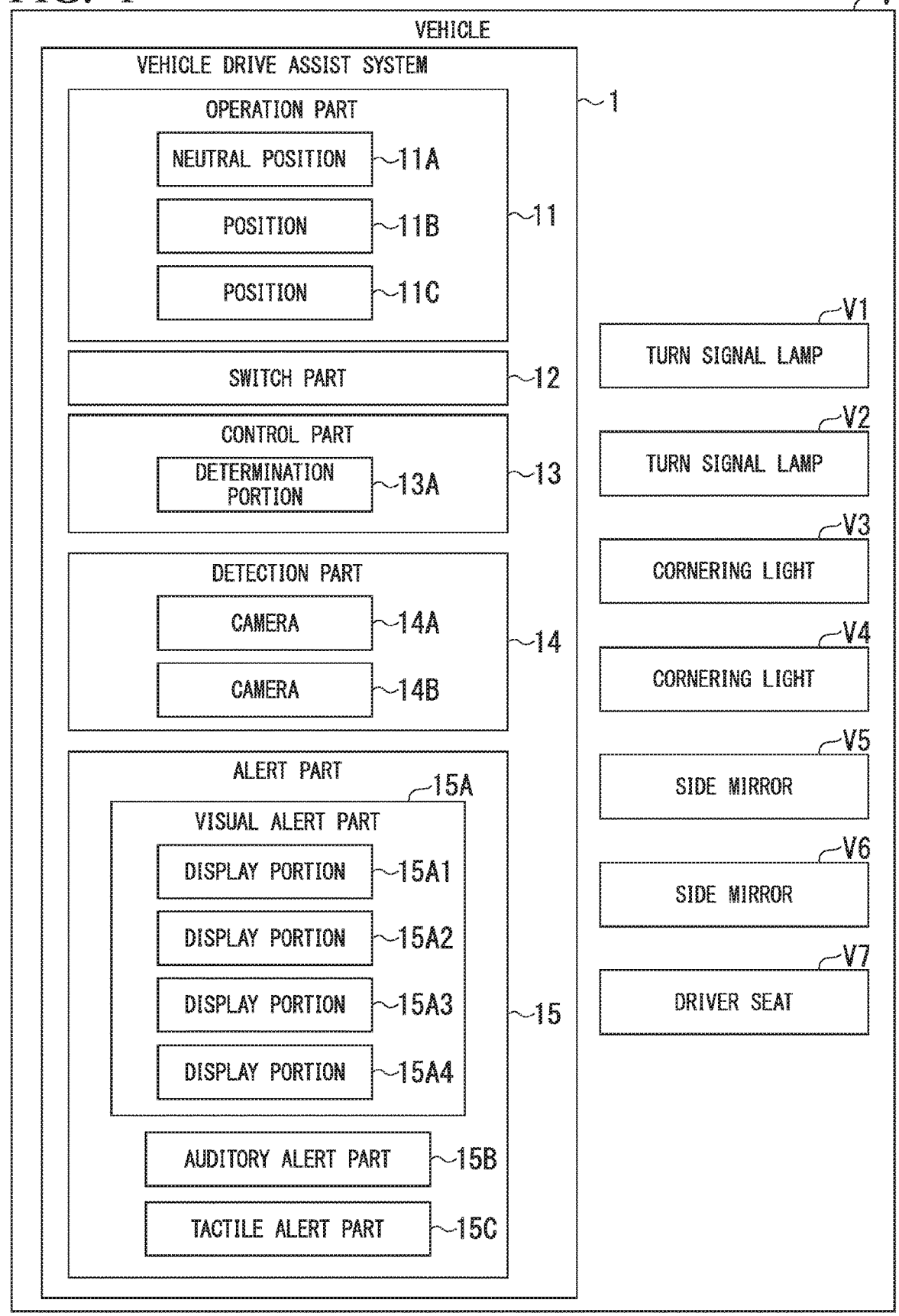
FIG. 1 is a view showing an example of a function of a vehicle drive assist system and the like of a first embodiment.

FIG. 1 is a view showing an example of a function of a vehicle drive assist system 1 and the like of a first embodiment.

In an example shown in FIG. 1, the vehicle drive assist system 1 is applied to a vehicle V that includes, for example, a left turn signal lamp V1, a right turn signal lamp V2, a left cornering light V3, a right cornering light V4, a left side mirror V5, a right side mirror V6, and a driver seat V7.

The left turn signal lamp V1 and the right turn signal lamp V2 are constituted similarly to, for example, a turn signal lamp described in Japanese Patent Application, Publication No. 2015-11960A and blink in response to an operation of an operation part 11 described later.

The left cornering light V3 and the right cornering light V4 are constituted similarly to, for example, a cornering light described in Japanese Patent Application, Publication No. 2012-113947A. The left cornering light V3 emits light in a left side direction of the vehicle V. The right cornering light V4 emits light in a right side direction of the vehicle V.

The left side mirror V5 and the right side mirror V6 are constituted similarly to, for example, a mirror unit described in Japanese Patent Application, Publication No. 2015-16708A. The left side mirror V5 is used for a driver in the driver seat V7 of the vehicle V to confirm a left rear direction of the vehicle V. The right side mirror V5 is used for the driver to confirm a right rear direction of the vehicle V.

In the example shown in FIG. 1, the side mirrors V5, V6 are door mirrors of the vehicle V. In another example, the side mirrors V5, V6 may be fender mirrors of the vehicle V.

In the example shown in FIG. 1, the vehicle drive assist system 1 includes the operation part 11, a switch part 12, a control part 13, a detection part 14, and an alert part 15.

The operation part 11 is constituted similarly to, for example, a second operation lever described in PCT International Publication No. WO 2013/160998. The operation part 11 is provided on the driver seat V7 of the vehicle V and is operated by the driver. The operation part 11 includes a neutral position 11A, a first position 11B, and a second position 11C. The operation part 11 is provided operable from the neutral position 11A to a first position 11B side (one side) and a second position 11C side (another side).

The neutral position 11A is a position at which the control part 13 does not basically generate a turn signal.

The first position 11B is a position at which the control part 13 basically generates, for example, a turn signal for a left turn of the vehicle V. The second position 11C is a position at which the control part 13 basically generates, for example, a turn signal for a right turn of the vehicle V.

The operation part 11 includes a function of returning to the neutral position 11A after being operated to the first position 11B by the driver or after satisfying a predetermined condition and a function of returning to the neutral position 11A after being operated to the second position 11C by the driver or after satisfying a predetermined condition. "After satisfying a predetermined condition" includes, for example, after the driver manually performs cancellation described later, after a right or left turn is completed, and the like.

In the technique described in PCT International Publication No. WO 2013/160998, the second operation lever as the operation part is arranged on a left side of a central axis line of a steering shaft; however, the operation part 11 may be arranged on a left side of a central axis line of a steering shaft similarly to the technique described in PCT International Publication No. WO 2013/160998 or may be arranged on a right side of the central axis line of the steering shaft.

In the example shown in FIG. 1, the switch part 12 is constituted similarly to, for example, a winker switch described in Japanese Patent Application, Publication No. 2008-162485A, a turn signal switch described in Japanese Patent Application, Publication No. S58-106714A, and the like. The switch part 12 changes a switching mode depending on a position (the neutral position 11A, the first position 11B, and the second position 11C) of the operation part 11.

Figure 2:
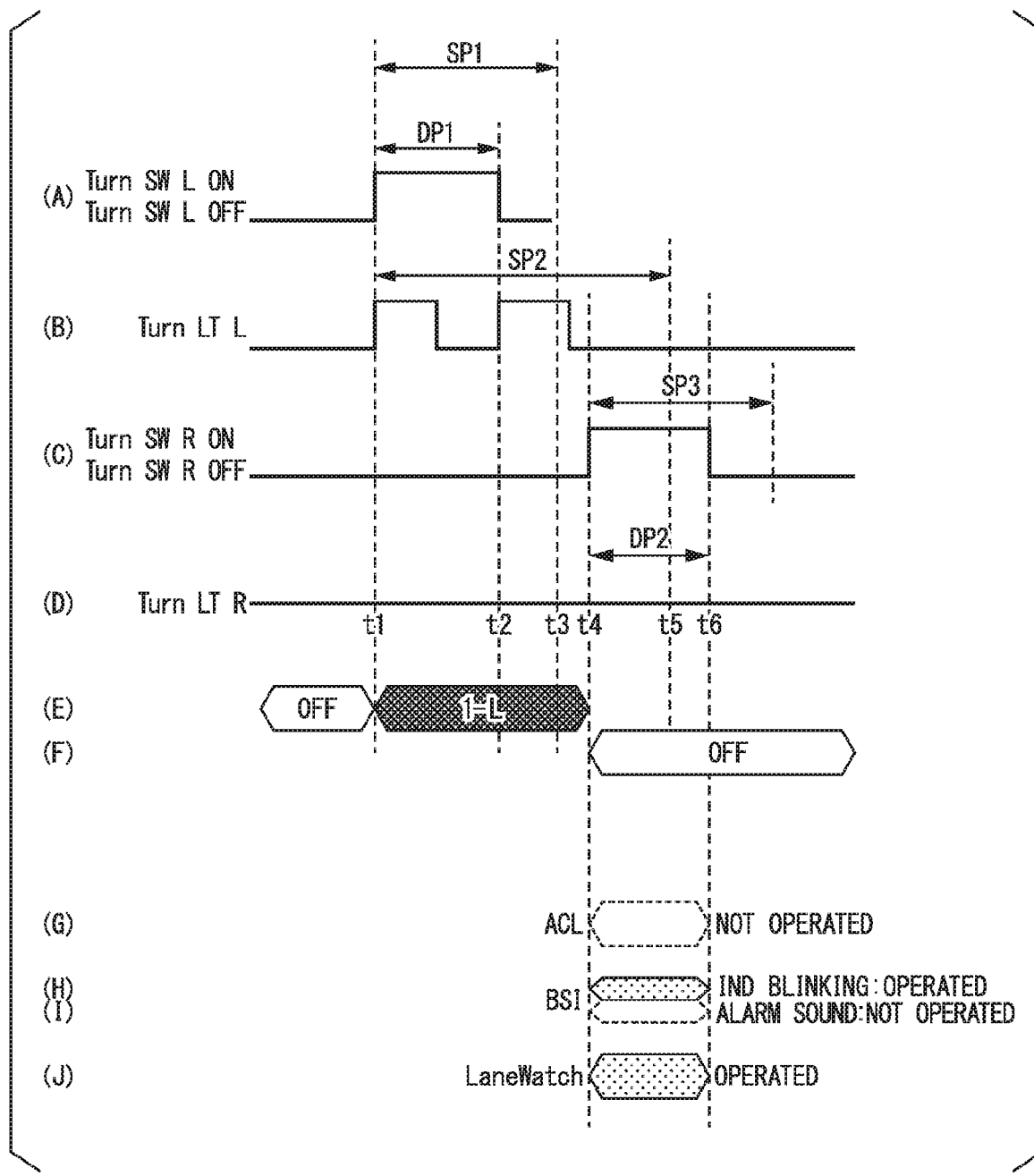
FIG. 2 is a view showing an example in which a control part generates a one touch turn signal, and then, the one touch turn signal is canceled.

For example, when the operation part 11 is positioned at the neutral position 11A, the switch part 12 basically outputs an OFF signal "Turn SW L OFF" (refer to part (A) of FIG. 2) (a signal that does not allow the control part 13 to generate a turn signal for a left turn and that does not allow the left turn signal lamp V1 to blink). Further, when the operation part 11 is positioned at the neutral position 11A, the switch part 12 basically outputs an OFF signal "Turn SW R OFF" (refer to part (C) of FIG. 2) (a signal that does not allow the control part 13 to generate a turn signal for a right turn and that does not allow the right turn signal lamp V2 to blink).

When the operation part 11 is positioned at the first position 11B, the switch part 12 basically outputs an ON signal "Turn SW L ON" (refer to part (A) of FIG. 2) (a signal that allows the control part 13 to generate a turn signal for a left turn and that allows the left turn signal lamp V1 to blink).

When the operation part 11 is positioned at the second position 11C, the switch part 12 basically outputs an ON signal "Turn SW R ON" (refer to part (C) of FIG. 2) (a signal that allows the control part 13 to generate a turn signal for a right turn and that allows the right turn signal lamp V2 to blink).

In the example shown in FIG. 1, the control part 13 generates the turn signal in accordance with the signal that is output by the switch part 12. In detail, when the switch part 12 outputs the OFF signal "Turn SW L OFF", the control part 13 does not basically generate the turn signal for the left turn that allows the left turn signal lamp V1 to blink. When the switch part 12 outputs the OFF signal "Turn SW R OFF", the control part 13 does not basically generate the turn signal for the right turn that allows the right turn signal lamp V2 to blink. When the switch part 12 outputs the ON signal "Turn SW L ON", the control part 13 basically generates a turn signal for a left turn "Turn LT L" (refer to part (B) of FIG. 2) that allows the left turn signal lamp V1 to blink. When the switch part 12 outputs the ON signal "Turn SW R ON", the control part 13 basically generates a turn signal for a right turn "Turn LT R" (refer to part (D) of FIG. 3) that allows the right turn signal lamp V2 to blink.

The control part 13 includes a determination portion 13A. The determination portion 13A performs a determination described later.

In the example shown in FIG. 1, the operation part 11 is an alternate type, and the control part 13 includes a function of generating a one touch turn signal "Turn LT L" (refer to part (B) of FIG. 2) described later.

The first position 11B of the operation part 11 includes a hold position at which the operation part 11 is held at the first position 11B even when the driver releases his/her hand from the operation part 11 and a non-hold position at which the operation part 11 is not held at the first position 11B and automatically returns to the neutral position 11A when the driver releases his/her hand from the operation part 11.

The second position 11C of the operation part 11 includes a hold position at which the operation part 11 is held at the second position 11C even when the driver releases his/her hand from the operation part 11 and a non-hold position at which the operation part 11 is not held at the second position 11C and automatically returns to the neutral position 11A when the driver releases his/her hand from the operation part 11.

When the driver moves the operation part 11 to the hold position of the first position 11B, as described above, the operation part 11 is held at the hold position of the first position 11B. During a period in which the operation part 11 is positioned at the hold position of the first position 11B, the switch part 12 outputs the ON signal "Turn SW L ON" (refer to part (A) of FIG. 4), the control part 13 generates the turn signal for a left turn (full turn signal) "Turn LT L" (refer to part (B) of FIG. 4), and the left turn signal lamp V1 blinks.

Figure 4:
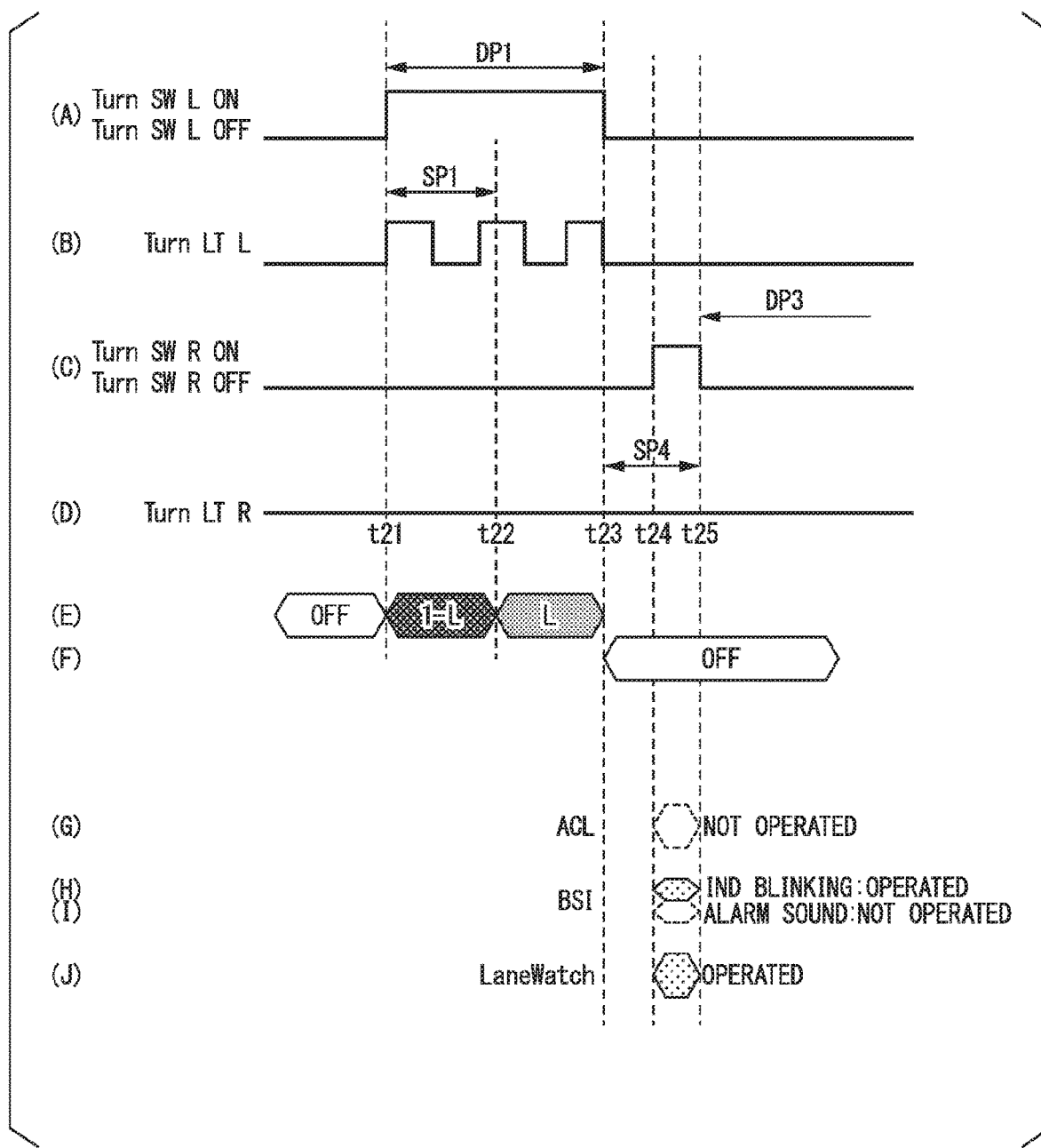
FIG. 4 is a view showing an example in which the control part generates a full turn signal, and then, a driver of a vehicle who intends to release the full turn signal erroneously operates an operation part.

Next, when the operation part 11 returns to the neutral position 11A from the hold position of the first position 11B, the signal that is output by the switch part 12 is switched from the ON signal "Turn SW L ON" to the OFF signal "Turn SW L OFF" (refer to part (A) of FIG. 4), the control part 13 does not generate the turn signal for the left turn "Turn LT L" (refer to part (B) of FIG. 4), and the left turn signal lamp V1 is turned off.

When the driver moves the operation part 11 to the hold position of the second position 11C, the operation part 11 is held at the hold position of the second position 11C. During a period in which the operation part 11 is positioned at the hold position of the second position 11C, the switch part 12 outputs the ON signal "Turn SW R ON", the control part 13 generates the turn signal for a right turn (full turn signal) "Turn LT R", and the right turn signal lamp V2 blinks.

Next, when the operation part 11 returns to the neutral position 11A from the hold position of the second position 11C, the signal that is output by the switch part 12 is switched from the ON signal "Turn SW R ON" to the OFF signal "Turn SW R OFF", the control part 13 does not generate the turn signal for the right turn "Turn LT R", and the right turn signal lamp V2 is turned off.

On the other hand, in a case where the driver moves the operation part 11 to the non-hold position of the first position 11B, as described above, the operation part 11 automatically returns to the neutral position 11A from the non-hold position of the first position 11B when the driver releases his/her hand from the operation part 11. During a period in which the operation part 11 is positioned at the non-hold position of the first position 11B, the switch part 12 outputs the ON signal "Turn SW L ON" (refer to part (A) of FIG. 2). The control part 13 generates the turn signal for a left turn (one touch turn signal) "Turn LT L" (refer to part (B) of FIG. 2) not only during the period in which the operation part 11 is positioned at the non-hold position of the first position 11B but also for a while after the operation part 11 returns to the neutral position 11A. The left turn signal lamp V1 blinks (for example, blinks three times) during a period in which the control part 13 generates the turn signal for the left turn "Turn LT L".

Next, when the control part 13 does not generate the turn signal for the left turn "Turn LT L", the left turn signal lamp V1 is turned off.

In a case where the driver moves the operation part 11 to the non-hold position of the second position 11C, the operation part 11 automatically returns to the neutral position 11A from the non-hold position of the second position 11C when the driver releases his/her hand from the operation part 11. During a period in which the operation part 11 is positioned at the non-hold position of the second position 11C, the switch part 12 outputs the ON signal "Turn SW R ON". The control part 13 generates the turn signal for a right turn (one touch turn signal) "Turn LT R" not only during the period in which the operation part 11 is positioned at the non-hold position of the second position 11C but also for a while after the operation part 11 returns to the neutral position 11A. The right turn signal lamp V2 blinks (for example, blinks three times) during a period in which the control part 13 generates the turn signal for the right turn "Turn LT R".

Next, when the control part 13 does not generate the turn signal for the right turn "Turn LT R", the right turn signal lamp V2 is turned off.

In another example, the operation part 11 may be a momentary type (a method which includes no hold position described above). Even in this example, the control part 13 includes a function of generating the one touch turn signal.

That is, the first position 11B of the operation part 11 of the momentary type includes only the non-hold position at which the operation part 11 is not held at the first position 11B and automatically returns to the neutral position 11A when the driver releases his/her hand from the operation part 11.

The second position 11C of the operation part 11 of the momentary type includes only the non-hold position at which the operation part 11 is not held at the second position 11C and automatically returns to the neutral position 11A when the driver releases his/her hand from the operation part 11.

In the example shown in FIG. 1, the detection part 14 detects right and left rear situations of the vehicle V. The detection part 14 includes, for example, a camera 14A and a camera 14B. The cameras 14A, 14B are constituted similarly to, for example, a camera described in Japanese Patent Application, Publication No. 2017-47817A. The camera 14A is arranged, for example, on the left side mirror V5 and captures an image of the left rear situation of the vehicle V. The camera 14B is arranged, for example, on the right side mirror V6 and captures an image of the right rear situation of the vehicle V.

In another example, the detection part 14 may detect right and left rear situations of the vehicle V using a different means than the camera such as a rear sonar, for example, described in Japanese Patent Application, Publication No. 2018-34654A.

Figure 10:
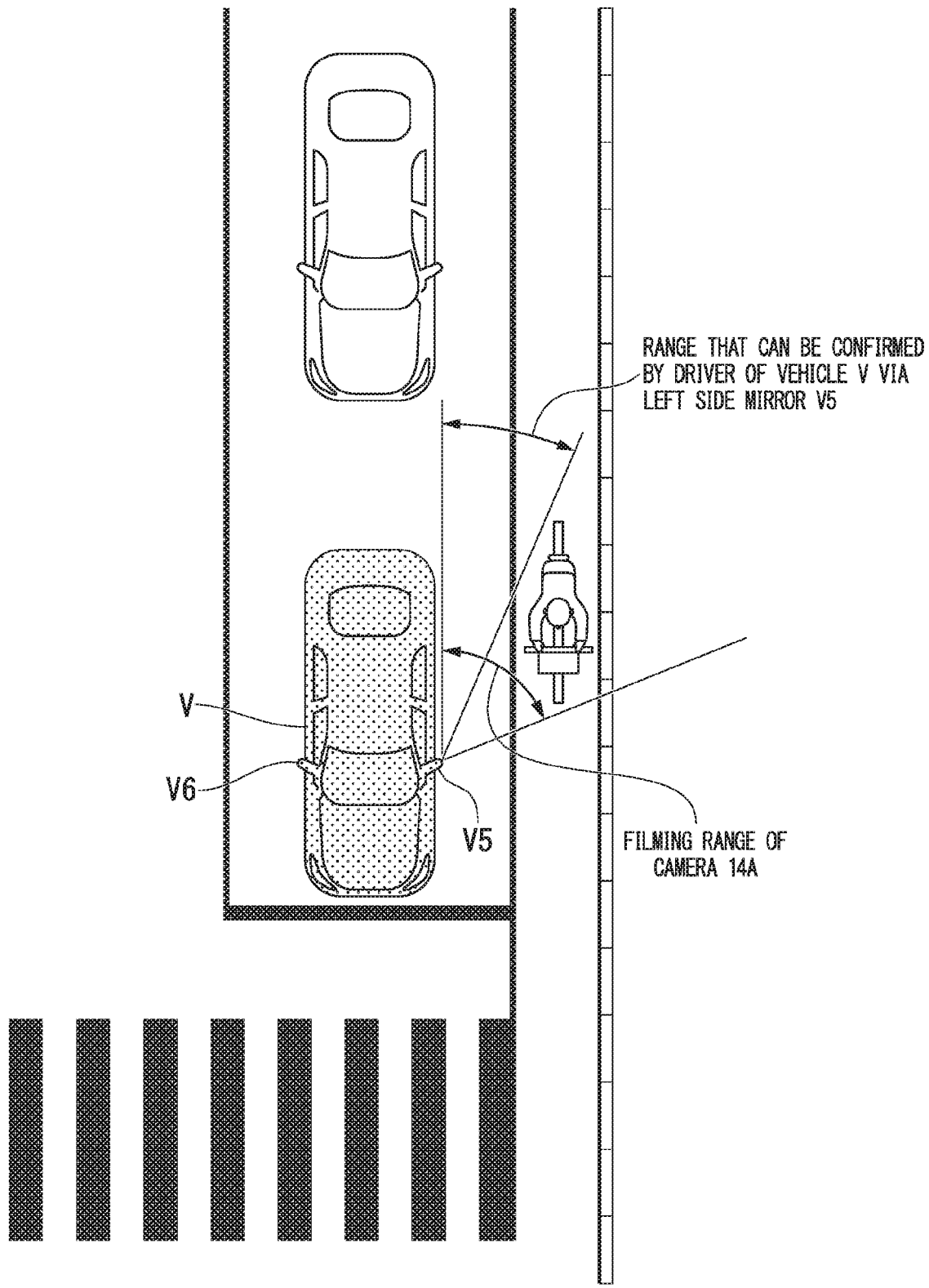
FIG. 10 is a view showing an example of a filming range of a camera that is arranged on the left side mirror.

FIG. 10 is a view showing an example of a filming range of the camera 14A that is arranged on the left side mirror V5.

In the example shown in FIG. 10, the filming range of the camera 14A is set to be a wider range than a range that can be confirmed by the driver of the vehicle V via the left side mirror V5.

In the example shown in FIG. 1, the alert part 15 performs an alert to, for example, the driver in the driver seat V7 of the vehicle V and the like based on an output of the ON signals "Turn SW L ON" and "Turn SW R ON" of the switch part 12 and a detection result of the detection part 14. The alert part 15 includes a visual alert part 15A, an auditory alert part 15B, and a tactile alert part 15C.

The visual alert part 15A performs a visual alert to, for example, the driver in the driver seat V7 of the vehicle V and the like. The visual alert part 15A includes display portions 15A1, 15A2, 15A3, 15A4. The display portions 15A1, 15A2 are constituted similarly to, for example, an indicator described in Japanese Patent Application, Publication No. 2015-16708A. The display portion 15A1 (first display portion) is provided on the left side mirror V5.

Figure 9A:
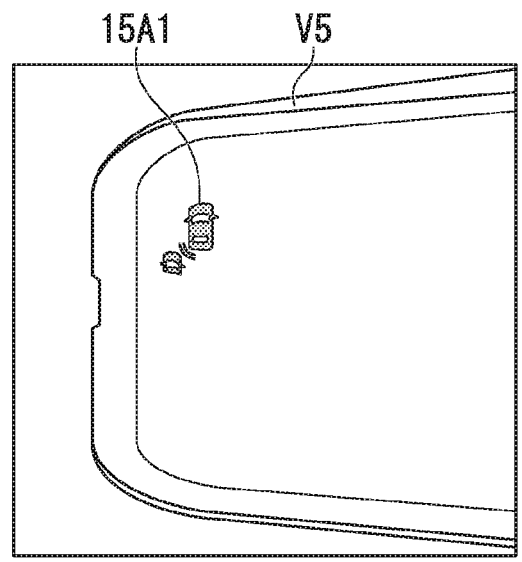
FIG. 9A is a view showing an example of a display portion that is provided on a left side mirror.
Figure 9B:
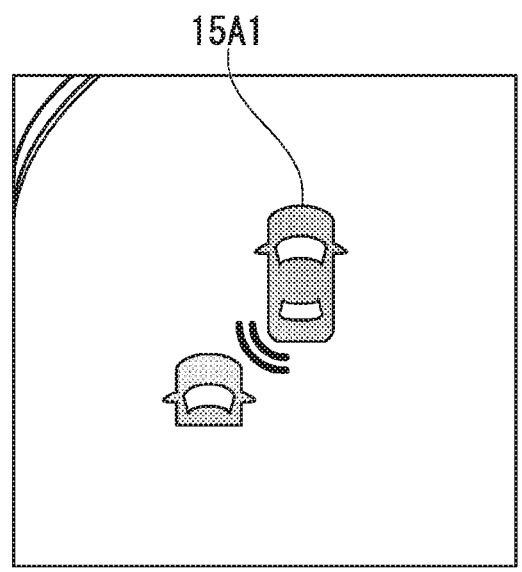
FIG. 9B is a view showing an example of the display portion that is provided on the left side mirror.
Figure 9C:
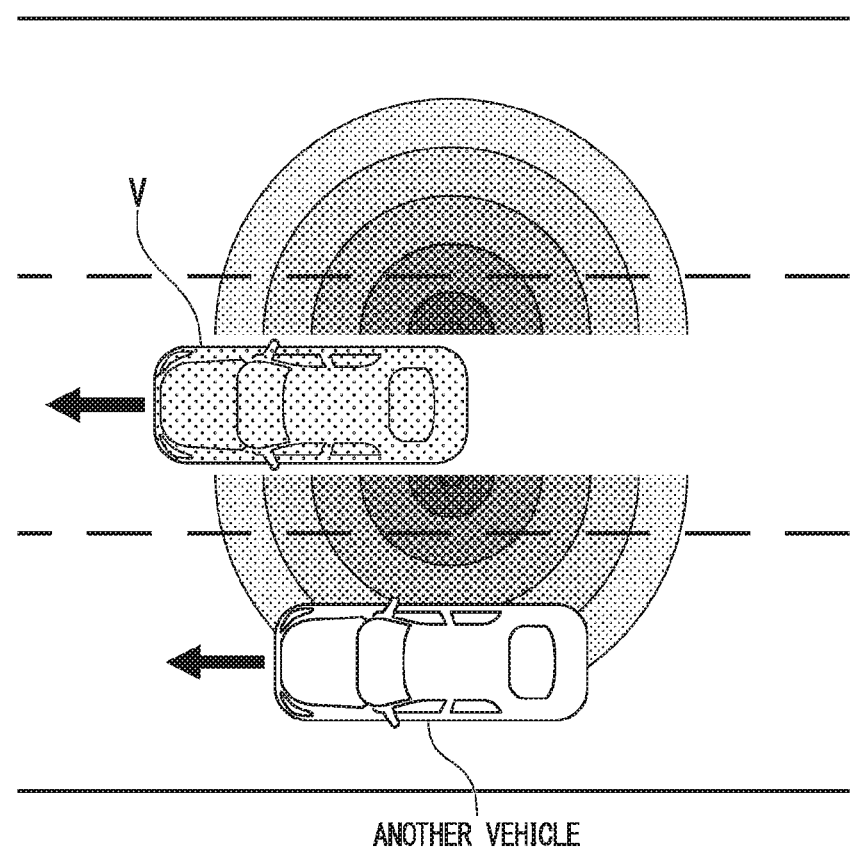
FIG. 9C is a view showing an example of the display portion that is provided on the left side mirror.

FIGS. 9A to 9C are views showing an example of the display portion 15A1 that is provided on the left side mirror V5. In detail, FIG. 9A is a view showing part of the left side mirror V5. FIG. 9B is an enlarged view of the display portion 15A1 that is provided on the left side mirror V5. FIG. 9C is a view showing a relationship between the vehicle V and another vehicle that is present in a left rear direction of the vehicle V.

In the example shown in FIGS. 9A to 9C, in a case where the detection part 14 detects another vehicle that is present in the left rear direction of the vehicle V when the vehicle V travels (refer to FIG. 9C) and in a case where the switch part 12 outputs the ON signal "Turn SW L ON" (refer to part (A) of FIG. 4), the display portion 15A1 of the visual alert part 15A of the alert part 15 performs an alert display (blink display) (refer to FIG. 9A and FIG. 9B).

In the example shown in FIG. 1, the display portion 15A2 (first display portion) is provided on the right side mirror V6.

The display portion 15A3 is constituted similarly to, for example, an indicator described in Japanese Patent Application, Publication No. 2009-211499A.

The display portion 15A3 is provided at a position away from a frontward direction of the driver seat V7 in a room of the vehicle V. In detail, the display portion 15A3 is arranged, for example, at a lower part of a front pillar (not shown) of the vehicle V. The display portion 15A4 is constituted similarly to, for example, a display portion described in Japanese Patent Application, Publication No. 2017-21441A.

Figure 8:
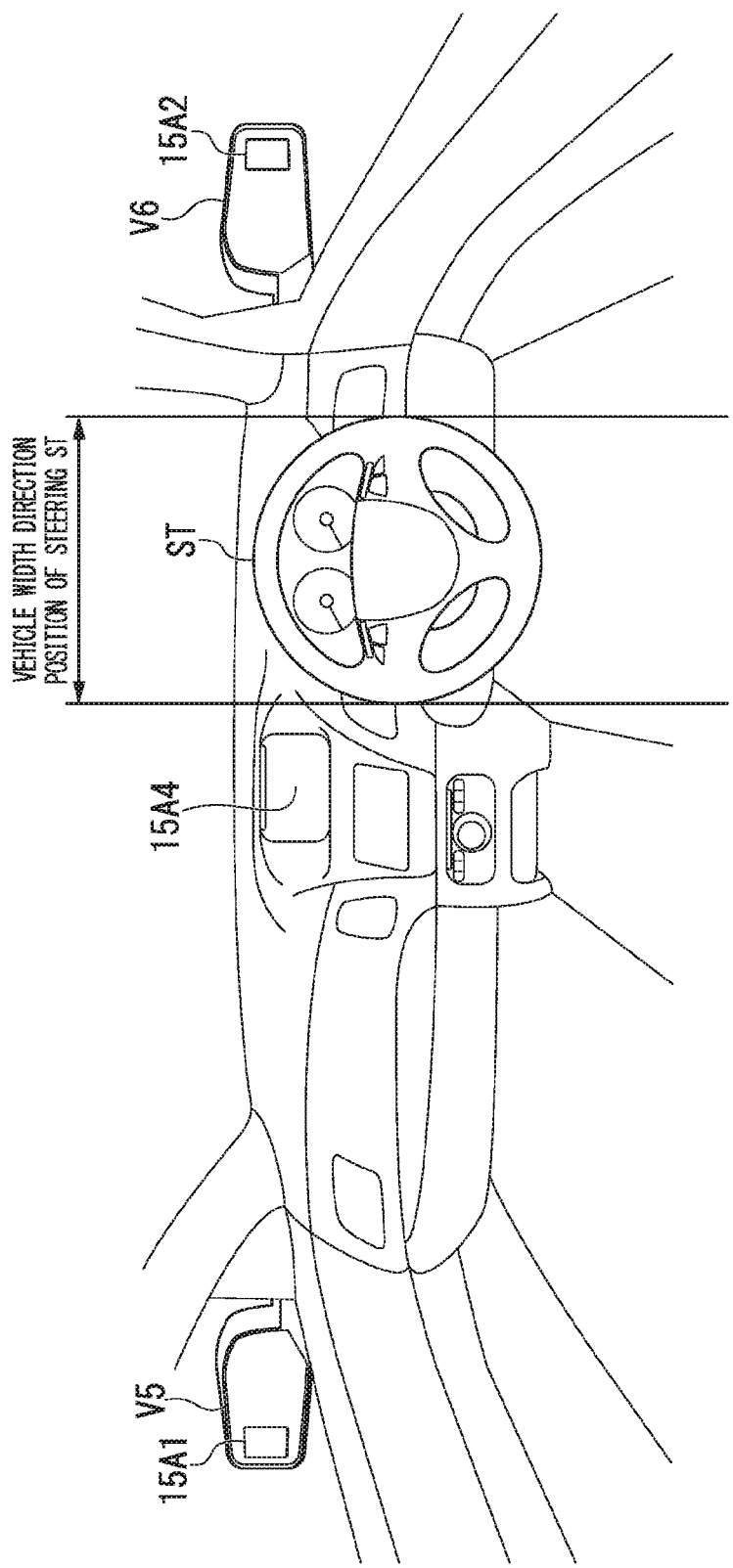

FIG. 8 is a view showing an arrangement of the display portion 15A4 and the like.

In the example shown in FIG. 8, the display portion 15A4 (second display portion) is provided at a position away from a vehicle width direction position of a steering ST.

In the example shown in FIG. 1, the auditory alert part 15B performs an auditory alert to, for example, the driver in the driver seat V7 of the vehicle V and the like. The auditory alert part 15B includes a speaker (not shown) that is constituted similarly to, for example, a speaker described in Japanese Patent Application, Publication No. 2014-56295A.

The tactile alert part 15C performs a tactile alert to, for example, the driver in the driver seat V7 of the vehicle V and the like. The tactile alert part 15C includes a vibration-imparting apparatus (not shown) that is constituted similarly to, for example, a vibration-imparting apparatus described in Japanese Patent Application, Publication No. 2018-62296A. The vibration-imparting apparatus performs a tactile alert to the driver in the driver seat V7 of the vehicle V, for example, by vibrating the steering, a seat, and the like.

In the example shown in FIG. 1, the alert part 15 includes the visual alert part 15A, the auditory alert part 15B, and the tactile alert part 15C; however, in another example, the alert part 15 may include the visual alert part 15A and the auditory alert part 15B and may not include the tactile alert part 15C. In still another example, the alert part 15 may include the visual alert part 15A and the tactile alert part 15C and may not include the auditory alert part 15B.

In the example shown in FIG. 1, the vehicle drive assist system 1 includes a function (blind spot information function) of detecting another vehicle that is present in a diagonally rearward direction of the vehicle V that easily becomes a blind angle of the driver when the vehicle V travels and calling the driver's attention (refer to FIGS. 9A to 9C).

In detail, when the vehicle V travels, in a case where the camera 14A of the detection part 14 captures an image of another vehicle that is present in a left rear direction of the vehicle V or where the sonar of the detection part 14 or the like detects another vehicle that is present in the left rear direction of the vehicle V (refer to FIG. 9C) and in a case where the switch part 12 outputs the ON signal "Turn SW L ON", the display portion 15A1 or the display portion 15A3 of the visual alert part 15A of the alert part 15 performs an alert display (blink display). When the vehicle V travels, in a case where the camera 14B of the detection part 14 captures an image of another vehicle that is present in a right rear direction of the vehicle V or where the sonar of the detection part 14 or the like detects another vehicle that is present in the right rear direction of the vehicle V and in a case where the switch part 12 outputs the ON signal "Turn SW R ON", the display portion 15A2 or the display portion 15A3 of the visual alert part 15A of the alert part 15 performs an alert display (blink display).

When the vehicle V travels, in a case where the camera 14A of the detection part 14 captures an image of another vehicle that is present in a left rear direction of the vehicle V or where the sonar of the detection part 14 or the like detects another vehicle that is present in the left rear direction of the vehicle V (refer to FIG. 9C) and in a case where the control part 13 generates the turn signal "Turn LT L", the auditory alert part 15B of the alert part 15 outputs an alarm sound. When the vehicle V travels, in a case where the camera 14B of the detection part 14 captures an image of another vehicle that is present in a right rear direction of the vehicle V or where the sonar of the detection part 14 or the like detects another vehicle that is present in the right rear direction of the vehicle V and in a case where the control part 13 generates the turn signal "Turn LT R", the auditory alert part 15B of the alert part 15 outputs an alarm sound.

In the example shown in FIG. 1, the vehicle drive assist system 1 includes a function (lane watch function) of allowing the display portion 15A4 (refer to FIG. 8) to display an image of a left rear situation (refer to FIG. 10) of the vehicle V that is captured by the camera 14A which is arranged on the left side mirror V5 or an image of a right rear situation of the vehicle V that is captured by the camera 14B which is arranged on the right side mirror V6.

In detail, when the vehicle V travels, in a case where the switch part 12 outputs the ON signal "Turn SW L ON", the display portion 15A4 (refer to FIG. 8) of the visual alert part 15A of the alert part 15 displays an image of a left rear situation (refer to FIG. 10) of the vehicle V that is captured by the camera 14A of the detection part 14. When the vehicle V travels, in a case where the switch part 12 outputs the ON signal "Turn SW R ON", the display portion 15A4 of the visual alert part 15A of the alert part 15 displays an image of a right rear situation of the vehicle V that is captured by the camera 14B of the detection part 14.

In the example shown in FIG. 1, the vehicle drive assist system 1 includes a function (active cornering light function) of turning on the cornering lights V3, V4 without a turn-on operation of the driver.

In detail, when the control part 13 generates the turn signal "Turn LT L", the control part 13 generates a signal that operates the left cornering light V3, and the left cornering light V3 is turned on and emits light to the left direction of the vehicle V. When the control part 13 generates the turn signal "Turn LT R", the control part 13 generates a signal that operates the right cornering light V4, and the right cornering light V4 is turned on and emits light to the right direction of the vehicle V.

FIG. 2 is a view showing an example in which the control part 13 generates the one touch turn signal "Turn LT L", and then, the one touch turn signal "Turn LT L" is canceled. In detail, part (A) of FIG. 2 shows an ON signal for a left turn "Turn SW L ON" and an OFF signal for a left turn "Turn SW L OFF" that are output by the switch part 12. Part (B) of FIG. 2 shows a turn signal for a left turn "Turn LT L" that is generated by the control part 13. Part (C) of FIG. 2 shows an ON signal for a right turn "Turn SW R ON" and an OFF signal for a right turn "Turn SW R OFF" that are output by the switch part 12. Part (D) of FIG. 2 shows a turn signal for a right turn "Turn LT R" that is generated by the control part 13. Part (E) of FIG. 2 shows a state (blinking or turned off) of the left turn signal lamp V1. Part (F) of FIG. 2 shows a state (blinking or turned off) of the right turn signal lamp V2. Part (G) of FIG. 2 shows a state (lighting or turned off) of the right cornering light V4.

Part (H) of FIG. 2 shows a state (performing a blink display or displaying nothing) of the display portion 15A2 or the display portion 15A3 of the visual alert part 15A. Part (I) of FIG. 2 shows a state (outputting an alarm sound or outputting nothing) of the auditory alert part 15B. Part (J) of FIG. 2 shows a state (displaying an image or displaying nothing) of the display portion 15A4 of the visual alert part 15A.

In the example shown in FIG. 2, the determination portion 13A of the control part 13 determines whether or not a determination period DP1 (refer to part (A) of FIG. 2) as a period in which the switch part 12 outputs the ON signal "Turn SW L ON" (refer to part (A) of FIG. 2) is equal to or more than a setting period SP1 (for example, 1000 [ms]) (refer to part (A) of FIG. 2).

When the determination period DP1 is less than the setting period SP1, the control part 13 performs a one touch turn control (a control shown in FIG. 2) that generates a turn signal (one touch turn signal) "Turn LT L" (refer to part (B) of FIG. 2) over a setting period SP2 (refer to part (B) of FIG. 2) that is longer than the setting period SP1.

In the example shown in FIG. 2, at a time t1, the driver moves the operation part 11 to the non-hold position of the first position 11B. Accordingly, the switch part 12 starts outputting the ON signal "Turn SW L ON" (refer to part (A) of FIG. 2). Accordingly, the control part 13 starts generating a turn signal for a left turn "Turn LT L" in accordance with the first position 11B of the operation part 11 (refer to part (B) of FIG. 2). Accordingly, the left turn signal lamp V1 starts blinking (refer to part (E) of FIG. 2).

In the example shown in FIG. 2, at the time t1, since the camera 14A of the detection part 14 does not capture an image of another vehicle that is present in a left rear direction of the vehicle V, the left cornering light V3 is not turned on, the display portion 15A1 or the display portion 15A3 of the visual alert part 15A does not start performing a blink display, and the auditory alert part 15B does not start outputting an alarm sound.

On the other hand, in another example, at the time t1, when the camera 14A of the detection part 14 captures an image of another vehicle that is present in a left rear direction of the vehicle V, the left cornering light V3 is turned on, the display portion 15A1 or the display portion 15A3 of the visual alert part 15A starts performing a blink display, and the auditory alert part 15B starts outputting an alarm sound.

In the example shown in FIG. 2, next, at a time t2, the output from the switch part 12 is switched from the ON signal "Turn SW L ON" to the OFF signal "Turn SW L OFF" (refer to part (A) of FIG. 2). The determination portion 13A of the control part 13 determines that the determination period DP1 (the time t1 to the time t2) in which the switch part 12 outputs the ON signal "Turn SW L ON" is less than the setting period SP1 (the time t1 to a time t3). As a result, after the time t2, the control part 13 also continues generating the turn signal for a left turn (one touch turn signal) "Turn LT L" (refer to part (B) of FIG. 2). In detail, the control part 13 allows the left turn signal lamp V1 to blink three times.

Next, at a time t4 in the setting period SP2 (the time t1 to a time t5) (refer to part (B) of FIG. 2) in which the control part 13 generates the one touch turn signal for a left turn "Turn LT L", the driver cancels the one touch turn signal for the left turn "Turn LT L" (refer to part (B) of FIG. 2) (that is, a one touch turn control is canceled). In detail, for example, the driver moves the operation part 11 to the non-hold position of the second position 11C. That is, the driver performs a one touch turn operation for a right turn (that is, of a reverse direction). Accordingly, the left turn signal lamp V1 is turned off (refer to part (E) of FIG. 2). Further, the switch part 12 starts outputting the ON signal "Turn SW R ON" in accordance with the second position 11C of the operation part 11 (refer to part (C) of FIG. 2). On the other hand, the control part 13 does not start generating a turn signal for a right turn "Turn LT R" in accordance with the second position 11C of the operation part 11 (refer to part (D) of FIG. 2). Therefore, the right turn signal lamp V2 does not start blinking (refer to part (F) of FIG. 2). Further, the right cornering light V4 is also not turned on (refer to part (G) of FIG. 2).

Further, at the time t4, when the camera 14B of the detection part 14 captures an image of another vehicle that is present in a right rear direction of the vehicle V, the display portion 15A2 or the display portion 15A3 of the visual alert part 15A starts performing a blink display (refer to part (H) of FIG. 2). On the other hand, even when the camera 14B of the detection part 14 captures an image of another vehicle that is present in a right rear direction of the vehicle V, the auditory alert part 15B does not start outputting an alarm sound (refer to part (I) of FIG. 2).

Further, at the time t4, the display portion 15A4 of the visual alert part 15A starts displaying an image of the right rear situation of the vehicle V that is captured by the camera 14B of the detection part 14 (refer to part (J) of FIG. 2).

In another example, a timing at which the display portion 15A2 or the display portion 15A3 starts performing a blink display and/or a timing at which the display portion 15A4 starts displaying an image may be different from the time t4, for example, by an amount of time lag.

In the example shown in FIG. 2, next, at a time t6, the operation part 11 returns to the neutral position 11A. Accordingly, the output from the switch part 12 is switched from the ON signal "Turn SW R ON" to the OFF signal "Turn SW R OFF" (refer to part (C) of FIG. 2). The determination portion 13A of the control part 13 determines whether or not a determination period DP2 (the time t4 to the time t6) (refer to part (C) of FIG. 2) in which the switch part 12 outputs the ON signal "Turn SW R ON" in accordance with the second position 11C of the operation part 11 is equal to or more than a setting period SP3 (for example, 350 [ms]) (refer to part (C) of FIG. 2). In detail, the determination portion 13A determines that the determination period DP2 (the time t4 to the time t6) is less than the setting period SP3. As a result, after the time t6, the control part 13 does not generate the turn signal for a right turn "Turn LT R" in accordance with the second position 11C of the operation part 11 (refer to part (D) of FIG. 2), and the right turn signal lamp V2 does not start blinking (refer to part (F) of FIG. 2).

Further, at the time t6, the display portion 15A2 or the display portion 15A3 of the visual alert part 15A ends a blink display (refer to part (H) of FIG. 2).

Further, at the time t6, the display portion 15A4 of the visual alert part 15A ends displaying an image of the right rear situation of the vehicle V that is captured by the camera 14B of the detection part 14 (refer to part (J) of FIG. 2).

That is, in the example shown in FIG. 2, when the switch part 12 outputs the ON signal "Turn SW R ON" in accordance with the second position 11C of the operation part 11 in the setting period SP2 (the time t1 to the time t5) in which the control part 13 generates the turn signal for a left turn "Turn LT L" in accordance with the first position 11B of the operation part 11, the determination portion 13A determines whether or not the determination period DP2 (the time t4 to the time t6) as a period in which the switch part 12 outputs the ON signal "Turn SW R ON" in accordance with the second position 11C of the operation part 11 is equal to or more than the setting period SP3.

When the determination period DP2 (the time t4 to the time t6) is less than the setting period SP3, for example, it can be estimated that the driver of the vehicle V intends to release the turn signal for a left turn "Turn LT L" in accordance with the first position 11B of the operation part 11 and does not intend to generate the turn signal for a right turn "Turn LT R" in accordance with the second position 11C of the operation part 11, and, for example, it can be estimated that the driver of the vehicle V does not wish an auditory and/or tactile alert.

Therefore, in the example shown in FIG. 2, when the determination period DP2 (the time t4 to the time t6) is less than the setting period SP3, the auditory alert part 15B and/or the tactile alert part 15C of the alert part 15 do not perform an auditory and/or tactile alert.

Therefore, in the example shown in FIG. 2, for example, it is possible to reduce a possibility that the auditory and/or tactile alert is performed when the driver of the vehicle V does not wish.

In the example shown in FIG. 2, in the time t4 to the time t6, only the visual alert part 15A (in detail, the display portion 15A4, and the display portion 15A2 or the display portion 15A3) of the alert part 15 performs a visual alert based on the output of the ON signal "Turn SW R ON" (refer to part (C) of FIG. 2) in accordance with the second position 11C of the operation part 11 and the detection result (an image of another vehicle that is present in a right rear direction of the vehicle V) of the detection part 14.

Further, in the example shown in FIG. 2, in the time t4 to the time t6, the display portion 15A2 that is provided on the right side mirror V6 or the display portions 15A3, 15A4 that are provided at a position away from a frontward direction of the driver seat V7 in a room of the vehicle V perform a visual alert.

Therefore, in the example shown in FIG. 2, it is possible to reduce a possibility that the driver has a feeling of unpleasantness compared to a case where the visual alert is performed in the frontward direction of the driver seat V7.

Figure 3:
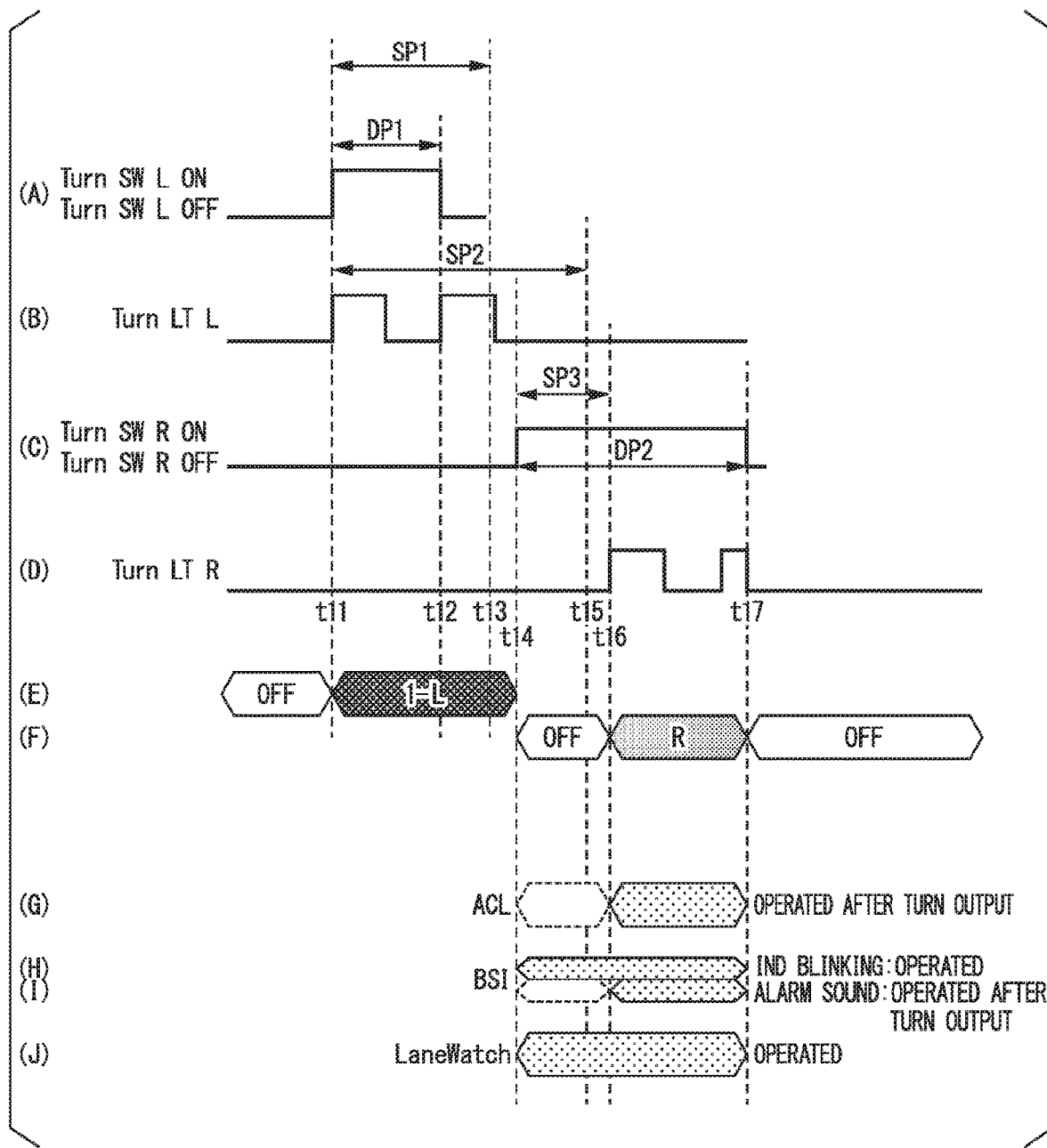
FIG. 3 is a view showing another example in which the control part generates a one touch turn signal, and then, the one touch turn signal is canceled.

FIG. 3 is a view showing another example in which the control part 13 generates the one touch turn signal "Turn LT L", and then, the one touch turn signal "Turn LT L" is canceled. In detail, part (A) of FIG. 3 shows an ON signal for a left turn "Turn SW L ON" and an OFF signal for a left turn "Turn SW L OFF" that are output by the switch part 12. Part (B) of FIG. 3 shows a turn signal for a left turn "Turn LT L" that is generated by the control part 13. Part (C) of FIG. 3 shows an ON signal for a right turn "Turn SW R ON" and an OFF signal for a right turn "Turn SW R OFF" that are output by the switch part 12.

Part (D) of FIG. 3 shows a turn signal for a right turn "Turn LT R" that is generated by the control part 13. Part (E) of FIG. 3 shows a state (blinking or turned off) of the left turn signal lamp V1. Part (F) of FIG. 3 shows a state (blinking or turned off) of the right turn signal lamp V2. Part (G) of FIG. 3 shows a state (lighting or turned off) of the right cornering light V4. Part (H) of FIG. 3 shows a state (performing a blink display or displaying nothing) of the display portion 15A2 or the display portion 15A3 of the visual alert part 15A. Part (I) of FIG. 3 shows a state (outputting an alarm sound or outputting nothing) of the auditory alert part 15B. Part (J) of FIG. 3 shows a state (displaying an image or displaying nothing) of the display portion 15A4 of the visual alert part 15A.

In the example shown in FIG. 3, similarly to the example shown in FIG. 2, the determination portion 13A of the control part 13 determines whether or not a determination period DP1 (refer to part (A) of FIG. 3) as a period in which the switch part 12 outputs the ON signal "Turn SW L ON"

(refer to part (A) of FIG. 3) is equal to or more than a setting period SP1 (for example, 1000 [ms]) (refer to part (A) of FIG. 3).

When the determination period DP1 is less than the setting period SP1, the control part 13 performs a one touch turn control (a control shown in FIG. 3) that generates a turn signal (one touch turn signal) "Turn LT L" (refer to part (B) of FIG. 3) over a setting period SP2 (refer to part (B) of FIG. 3) that is longer than the setting period SP1.

In the example shown in FIG. 3, at a time t11, the driver moves the operation part 11 to the non-hold position of the first position 11B. Accordingly, the switch part 12 starts outputting the ON signal "Turn SW L ON" (refer to part (A) of FIG. 3). Accordingly, the control part 13 starts generating a turn signal for a left turn "Turn LT L" in accordance with the first position 11B of the operation part 11 (refer to part (B) of FIG. 3). Accordingly, the left turn signal lamp V1 starts blinking (refer to part (E) of FIG. 3).

In the example shown in FIG. 3, at the time t11, since the camera 14A of the detection part 14 does not capture an image of another vehicle that is present in a left rear direction of the vehicle V, the left cornering light V3 is not turned on, the display portion 15A1 or the display portion 15A3 of the visual alert part 15A does not start performing a blink display, and the auditory alert part 15B does not start outputting an alarm sound.

On the other hand, in another example, at the time t11, when the camera 14A of the detection part 14 captures an image of another vehicle that is present in a left rear direction of the vehicle V, the left cornering light V3 is turned on, the display portion 15A1 or the display portion 15A3 of the visual alert part 15A starts performing a blink display, and the auditory alert part 15B starts outputting an alarm sound.

In the example shown in FIG. 3, next, at a time t12, the output from the switch part 12 is switched from the ON signal "Turn SW L ON" to the OFF signal "Turn SW L OFF" (refer to part (A) of FIG. 3). The determination portion 13A of the control part 13 determines that the determination period DP1 (the time t11 to the time t12) in which the switch part 12 outputs the ON signal "Turn SW L ON" is less than the setting period SP1 (the time t11 to a time t13). As a result, after the time t12, the control part 13 also continues generating the turn signal for a left turn (one touch turn signal) "Turn LT L" (refer to part (B) of FIG. 3). In detail, the control part 13 allows the left turn signal lamp V1 to blink three times.

Next, at a time t14 in the setting period SP2 (the time t11 to a time t15) (refer to part (B) of FIG. 3) in which the control part 13 generates the one touch turn signal for a left turn "Turn LT L", the driver cancels the one touch turn signal for the left turn "Turn LT L" (refer to part (B) of FIG. 3) (that is, a one touch turn control is canceled). In detail, for example, the driver moves the operation part 11 to the non-hold position of the second position 11C. Accordingly, the left turn signal lamp V1 is turned off (refer to part (E) of FIG. 3). Further, the switch part 12 starts outputting the ON signal "Turn SW R ON" in accordance with the second position 11C of the operation part 11 (refer to part (C) of FIG. 3). On the other hand, the control part 13 does not yet start generating a turn signal for a right turn "Turn LT R" in accordance with the second position 11C of the operation part 11 (refer to part (D) of FIG. 3). Therefore, the right turn signal lamp V2 does not yet start blinking (refer to part (F) of FIG. 3). Further, the right cornering light V4 is also not yet turned on (refer to part (G) of FIG. 3).

Further, at the time t14, when the camera 14B of the detection part 14 captures an image of another vehicle that is present in a right rear direction of the vehicle V, the display portion 15A2 or the display portion 15A3 of the visual alert part 15A starts performing a blink display (refer to part (H) of FIG. 3). On the other hand, even when the camera 14B of the detection part 14 captures an image of another vehicle that is present in a right rear direction of the vehicle V, the auditory alert part 15B does not yet start outputting an alarm sound (refer to part (I) of FIG. 3).

Further, at the time t14, the display portion 15A4 of the visual alert part 15A starts displaying an image of the right rear situation of the vehicle V that is captured by the camera 14B of the detection part 14 (refer to part (J) of FIG. 3).

Next, the determination portion 13A of the control part 13 determines whether or not a determination period DP2 (the time t14 to a time t17) in which the switch part 12 outputs the ON signal "Turn SW R ON" in accordance with the second position 11C of the operation part 11 is equal to or more than a setting period SP3 (for example, 350 [ms]) (refer to part (C) of FIG. 3). In detail, at a time t16, the determination portion 13A determines that the determination period DP2 (the time t14 to the time t17) is equal to or more than the setting period SP3. As a result, at the time t16, the control part 13 starts generating the turn signal for a right turn "Turn LT R" in accordance with the second position 11C of the operation part 11 (refer to part (D) of FIG. 3). Accordingly, the right turn signal lamp V2 starts blinking (refer to part (F) of FIG. 3). Further, the right cornering light V4 is turned on (refer to part (G) of FIG. 3).

Further, at the time t16, the auditory alert part 15B starts outputting an alarm sound (refer to part (I) of FIG. 3).

The display portion 15A2 or the display portion 15A3 of the visual alert part 15A continues performing a blink display (refer to part (H) of FIG. 3), and the display portion 15A4 of the visual alert part 15A continues displaying an image of the right rear situation of the vehicle V that is captured by the camera 14B of the detection part 14 (refer to part (J) of FIG. 3).

In another example, a timing at which the right cornering light V4 is turned on and/or a timing at which the auditory alert part 15B starts outputting an alarm sound may be different from the time t16, for example, by an amount of time lag.

In the example shown in FIG. 3, next, at the time t17, the operation part 11 returns to the neutral position 11A.

Accordingly, the output from the switch part 12 is switched from the ON signal "Turn SW R ON" to the OFF signal "Turn SW R OFF" (refer to part (C) of FIG. 3). Accordingly, the control part 13 does not generate the turn signal for a right turn "Turn LT R" (refer to part (D) of FIG. 3). Accordingly, the right turn signal lamp V2 is turned off (refer to part (F) of FIG. 3). Further, the right cornering light V4 is also turned off (refer to part (G) of FIG. 3).

Further, at the time t17, the display portion 15A2 or the display portion 15A3 of the visual alert part 15A ends a blink display (refer to part (H) of FIG. 3), and the auditory alert part 15B ends outputting an alarm sound (refer to part (I) of FIG. 3).

Further, at the time t17, the display portion 15A4 of the visual alert part 15A ends displaying an image of the right rear situation of the vehicle V that is captured by the camera 14B of the detection part 14 (refer to part (J) of FIG. 3).

In a case where the determination period DP2 (the time t14 to the time t17) is equal to or more than the setting period SP3 (refer to part (C) of FIG. 3), that is, in a case where the output of the ON signal "Turn SW R ON" continues after the setting period SP3 (the time t14 to the time t16) elapses, for example, it can be estimated that the driver of the vehicle V not only intends to release the turn signal for a left turn "Turn LT L" (refer to part (B) of FIG. 3) in accordance with the first position 11B of the operation part 11 but also intends to generate the turn signal for a right turn "Turn LT R" (refer to part (D) of FIG. 3).

Therefore, in the example shown in FIG. 3, as described above, in a case where the determination period DP2 (the time t14 to the time t17) is equal to or more than the setting period SP3 (refer to part (C) of FIG. 3), that is, in a case where the output of the ON signal "Turn SW R ON" continues after the setting period SP3 (the time t14 to the time t16) elapses, the control part 13 generates a turn signal for a right turn "Turn LT R" (refer to part (D) of FIG. 3). Therefore, it is possible to satisfy the request of the driver of the vehicle V who intends to generate the turn signal for a right turn "Turn LT R".

Further, in the example shown in FIG. 3, in a case where the determination period DP2 (the time t14 to the time t17) is equal to or more than the setting period SP3 (refer to part (C) of FIG. 3), that is, in a case where the output of the ON signal "Turn SW R ON" continues after the setting period SP3 (the time t14 to the time t16) elapses, the auditory alert part 15B performs an auditory alert based on the output of the ON signal "Turn SW R ON" (refer to part (C) of FIG. 3) in accordance with the second position 11C of the operation part 11 and the detection result (an image of another vehicle that is present in a right rear direction of the vehicle V) of the camera 14B of the detection part 14. Therefore, it is possible to improve the safety compared to a case where the alert by the alert part 15 is not performed.

In the example shown in FIG. 3, at the time t16, the tactile alert part 15C does not perform a tactile alert; however, in another example, at the time t16, the tactile alert part 15C may perform a tactile alert.

Further, in the example shown in FIG. 3, in a case where the determination period DP2 (the time t14 to the time t17) is equal to or more than the setting period SP3 (refer to part (C) of FIG. 3), that is, in a case where the output of the ON signal "Turn SW R ON" continues after the setting period SP3 (the time t14 to the time t16) elapses, the control part 13 generates a signal that operates the right cornering light V4 which corresponds to the turn signal for a right turn "Turn LT R" (refer to part (D) of FIG. 3), and accordingly, the right cornering light V4 is turned on.

Therefore, it is possible to improve the safety compared to a case where the right cornering light V4 is not turned on at the time t16.

In the example shown in FIG. 3, at the time of start of the setting period SP3 (the time t14 to the time t16), the driver moves the operation part 11 to the second position 11C only once; however, in another example, in the setting period SP3 (the time t14 to the time t16), the driver moves the operation part 11 twice. In detail, in the setting period SP3, after being operated to return to the neutral position 11A, the operation part 11 is operated to the second position 11C again. As a result, in this example, the control part 13 generates a turn signal for a right turn "Turn LT R" before the setting period SP3 elapses (at or before the time t16). Further, in a case where the camera 14B of the detection part 14 captures an image of another vehicle that is present in a right rear direction of the vehicle V before the setting period SP3 elapses (at or before the time t16), the auditory alert part 15B starts outputting an alarm sound based on the output of the ON signal "Turn SW R ON".

FIG. 4 is a view showing an example in which the control part 13 generates a full turn signal "Turn LT L", and then, the driver of the vehicle V who intends to release the full turn signal "Turn LT L" erroneously operates the operation part 11 to the second position 11C.

In detail, part (A) of FIG. 4 shows an ON signal for a left turn "Turn SW L ON" and an OFF signal for a left turn "Turn SW L OFF" that are output by the switch part 12. Part (B) of FIG. 4 shows a turn signal for a left turn "Turn LT L" that is generated by the control part 13.

Part (C) of FIG. 4 shows an ON signal for a right turn "Turn SW R ON" and an OFF signal for a right turn "Turn SW R OFF" that are output by the switch part 12. Part (D) of FIG. 4 shows a turn signal for a right turn "Turn LT R" that is generated by the control part 13. Part (E) of FIG. 4 shows a state (blinking or turned off) of the left turn signal lamp V1. Part (F) of FIG. 4 shows a state (blinking or turned off) of the right turn signal lamp V2. Part (G) of FIG. 4 shows a state (lighting or turned off) of the right cornering light V4. Part (H) of FIG. 4 shows a state (performing a blink display or displaying nothing) of the display portion 15A2 or the display portion 15A3 of the visual alert part 15A. Part (I) of FIG. 4 shows a state (outputting an alarm sound or outputting nothing) of the auditory alert part 15B. Part (J) of FIG. 4 shows a state (displaying an image or displaying nothing) of the display portion 15A4 of the visual alert part 15A.

In the example shown in FIG. 4, the determination portion 13A of the control part 13 determines whether or not a determination period DP1 (refer to part (A) of FIG. 4) as a period in which the switch part 12 outputs the ON signal "Turn SW L ON" (refer to part (A) of FIG. 4) is equal to or more than a setting period SP1 (for example, 1000 [ms]) (refer to part (A) of FIG. 4).

When the determination period DP1 is equal to or more than the setting period SP1, the control part 13 performs a full turn control (a control shown in FIG. 4) that generates a turn signal (full turn signal) "Turn LT L" (refer to part (B) of FIG. 4) over the determination period DP1 (refer to part (A) of FIG. 4).

In the example shown in FIG. 4, at a time t21, the driver moves the operation part 11 to the hold position of the first position 11B. Accordingly, the switch part 12 starts outputting the ON signal "Turn SW L ON" (refer to part (A) of FIG. 4). Accordingly, the control part 13 starts generating a turn signal for a left turn "Turn LT L" in accordance with the first position 11B of the operation part 11 (refer to part (B) of FIG. 4). Accordingly, the left turn signal lamp V1 starts blinking (refer to part (E) of FIG. 4).

In the example shown in FIG. 4, at the time t21, since the camera 14A of the detection part 14 does not capture an image of another vehicle that is present in a left rear direction of the vehicle V, the left cornering light V3 is not turned on, the display portion 15A1 or the display portion 15A3 of the visual alert part 15A does not start performing a blink display, and the auditory alert part 15B does not start outputting an alarm sound.

On the other hand, in another example, at the time t21, when the camera 14A of the detection part 14 captures an image of another vehicle that is present in a left rear direction of the vehicle V, the left cornering light V3 is turned on, the display portion 15A1 or the display portion 15A3 of the visual alert part 15A starts performing a blink display, and the auditory alert part 15B starts outputting an alarm sound.

In the example shown in FIG. 4, next, at a time t22, the determination portion 13A of the control part 13 determines that the determination period DP1 (the time t21 to a time t23) in which the switch part 12 outputs the ON signal "Turn SW L ON" becomes equal to or more than the setting period SP1 (the time t21 to a time t22).

Next, at the time t23, the predetermined condition described above is satisfied, and the operation part 11 moves from the first position 11B to the neutral position 11A. Accordingly, the output from the switch part 12 is switched from the ON signal "Turn SW L ON" to the OFF signal "Turn SW L OFF" (refer to part (A) of FIG. 4). Accordingly, the control part 13 does not generate the turn signal for a left turn "Turn LT L" (refer to part (B) of FIG. 4). Accordingly, the left turn signal lamp V1 is turned off (refer to part (E) of FIG. 4).

That is, in the example shown in FIG. 4, the control part 13 continuously generates the turn signal for a left turn "Turn LT L" until the predetermined condition described above is satisfied (until the time t23).

Next, at a time t24, the driver of the vehicle V who intends to release the full turn signal "Turn LT L" (refer to part (B) of FIG. 4) erroneously moves the operation part 11 from the neutral position 11A to the second position 11C. That is, the driver erroneously performs a one touch turn operation for a right turn. Accordingly, the switch part 12 starts outputting the ON signal "Turn SW R ON" in accordance with the second position 11C of the operation part 11 (refer to part (C) of FIG. 4). On the other hand, the control part 13 does not start generating a turn signal for a right turn "Turn LT R" in accordance with the second position 11C of the operation part 11 (refer to part (D) of FIG. 4). Therefore, the right turn signal lamp V2 does not start blinking (refer to part (F) of FIG. 4). Further, the right cornering light V4 is also not turned on (refer to part (G) of FIG. 4).

In the example shown in FIG. 4, the operation part 11 is moved to the second position 11C at the time t24 after the full turn signal "Turn LT L" (refer to part (B) of FIG. 4) is generated; however, in another example, the operation part 11 may be moved to the second position 11C when the full turn signal "Turn LT L" (refer to part (B) of FIG. 4) is generated. In this example, at a time point when the operation part 11 is moved to the second position 11C, the full turn control in accordance with the first position 11B of the operation part 11 is cancelled.

In the example shown in FIG. 4, at the time t24, when the camera 14B of the detection part 14 captures an image of another vehicle that is present in a right rear direction of the vehicle V, the display portion 15A2 or the display portion 15A3 of the visual alert part 15A starts performing a blink display (refer to part (H) of FIG. 4). On the other hand, even when the camera 14B of the detection part 14 captures an image of another vehicle that is present in a right rear direction of the vehicle V, the auditory alert part 15B does not start outputting an alarm sound (refer to part (I) of FIG. 4).

Further, at the time t24, the display portion 15A4 of the visual alert part 15A starts displaying an image of the right rear situation of the vehicle V that is captured by the camera 14B of the detection part 14 (refer to part (J) of FIG. 4).

In another example, a timing at which the display portion 15A2 or the display portion 15A3 starts performing a blink display and/or a timing at which the display portion 15A4 starts displaying an image may be different from the time t24, for example, by an amount of time lag.

In the example shown in FIG. 4, next, at a time t25, the operation part 11 returns to the neutral position 11A from the second position 11C. Accordingly, the output from the switch part 12 is switched from the ON signal "Turn SW R ON" to the OFF signal "Turn SW R OFF" (refer to part (C) of FIG. 4).

The determination portion 13A of the control part 13 determines whether or not the switch part 12 continues outputting the ON signal "Turn SW R ON" (refer to part (C) of FIG. 4) in accordance with the second position 11C of the operation part 11 in a determination period DP3 as a period after a time point (the time t25) when a setting period SP4 (the time t23 to the time t25) elapses from an end time point (the time t23) of the determination period DP1 (the time t21 to the time t23). In detail, the determination portion 13A determines that the switch part 12 does not continue outputting the ON signal "Turn SW R ON" (refer to part (C) of FIG. 4) in the determination period DP3. As a result, after the time t25, the control part 13 does not generate the turn signal for a right turn "Turn LT R" in accordance with the second position 11C of the operation part 11 (refer to part (D) of FIG. 4), and the right turn signal lamp V2 does not start blinking (refer to part (F) of FIG. 4).

Further, at the time t25, the display portion 15A2 or the display portion 15A3 of the visual alert part 15A ends a blink display (refer to part (H) of FIG. 4).

Further, at the time t25, the display portion 15A4 of the visual alert part 15A ends displaying an image of the right rear situation of the vehicle V that is captured by the camera 14B of the detection part 14 (refer to part (J) of FIG. 4).

That is, in the example shown in FIG. 4, in a case where the switch part 12 outputs the ON signal "Turn SW R ON" (refer to part (C) of FIG. 4) in accordance with the second position 11C of the operation part 11 after the control part 13 generates a turn signal for a left turn "Turn LT L" (refer to part (B) of FIG. 4) in accordance with the first position 11B of the operation part 11 over the determination period DP1 (the time t21 to the time t23), the determination portion 13A determines whether or not the switch part 12 continues outputting the ON signal "Turn SW R ON" in accordance with the second position 11C of the operation part 11 in the determination period DP3 as a period after the time point (the time t25) when the setting period SP4 (the time t23 to the time t25) elapses from the end time point (the time t23) of the determination period DP1.

When the switch part 12 does not continue outputting the ON signal "Turn SW R ON" in accordance with the second position 11C of the operation part 11 in the determination period DP3, it can be estimated that the driver of the vehicle V who intends to release the turn signal for a left turn "Turn LT L" (refer to part (B) of FIG. 4) in accordance with the first position 11B of the operation part 11 erroneously operates the operation part 11 to the second position 11C although there is no intention to generate the turn signal "Turn LT R" (refer to part (D) of FIG. 4) in accordance with the second position 11C of the operation part 11.

Therefore, in the example shown in FIG. 4, when the switch part 12 does not continue outputting the ON signal "Turn SW R ON" (refer to part (C) of FIG. 4) in accordance with the second position 11C of the operation part 11 in the determination period DP3 (after the time t25), the auditory alert part 15B and/or the tactile alert part 15C of the alert part 15 do not perform an auditory and/or tactile alert.

Therefore, in the example shown in FIG. 4, it is possible to reduce a possibility that the auditory and/or tactile alert is performed when the driver of the vehicle V erroneously operates the operation part 11. That is, it is possible to reduce a possibility that the auditory and/or tactile alert is performed when the driver of the vehicle V does not wish.

In the example shown in FIG. 4, in the time t24 to the time t25, only the visual alert part 15A (in detail, the display portion 15A4, and the display portion 15A2 or the display portion 15A3) of the alert part 15 performs a visual alert based on the output of the ON signal "Turn SW R ON" (refer to part (C) of FIG. 4) in accordance with the second position 11C of the operation part 11 and the detection result (an image of another vehicle that is present in a right rear direction of the vehicle V) of the detection part 14.

Further, in the example shown in FIG. 4, in the time t24 to the time t25, the display portion 15A2 that is provided on the right side mirror V6 or the display portions 15A3, 15A4 that are provided at a position away from a frontward direction of the driver seat V7 in a room of the vehicle V perform a visual alert.

Therefore, in the example shown in FIG. 4, it is possible to reduce a possibility that the driver has a feeling of unpleasantness compared to a case where the visual alert is performed in the frontward direction of the driver seat V7.

Figure 5:
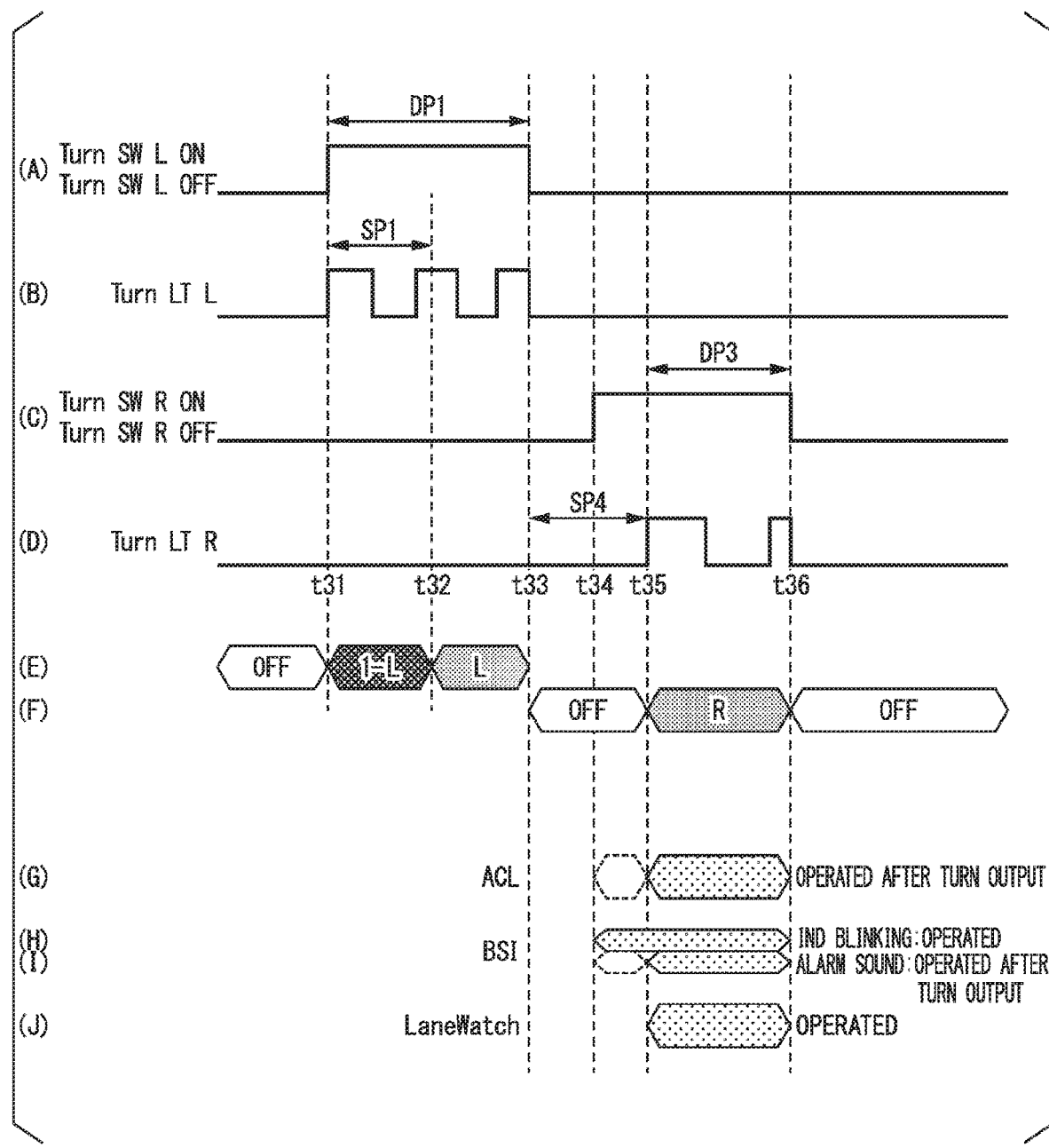
FIG. 5 is a view showing an example in which the control part generates a full turn signal for a left turn, and then, the driver of the vehicle who intends to generate a turn signal for a right turn operates the operation part.

FIG. 5 is a view showing an example in which the control part 13 generates a full turn signal for a left turn "Turn LT L", and then, the driver of the vehicle V who intends to generate a turn signal for a right turn "Turn LT R" operates the operation part 11.

In detail, part (A) of FIG. 5 shows an ON signal for a left turn "Turn SW L ON" and an OFF signal for a left turn "Turn SW L OFF" that are output by the switch part 12. Part (B) of FIG. 5 shows a turn signal for a left turn "Turn LT L" that is generated by the control part 13.

Part (C) of FIG. 5 shows an ON signal for a right turn "Turn SW R ON" and an OFF signal for a right turn "Turn SW R OFF" that are output by the switch part 12. Part (D) of FIG. 5 shows a turn signal for a right turn "Turn LT R" that is generated by the control part 13. Part (E) of FIG. 5 shows a state (blinking or turned off) of the left turn signal lamp V1. Part (F) of FIG. 5 shows a state (blinking or turned off) of the right turn signal lamp V2. Part (G) of FIG. 5 shows a state (lighting or turned off) of the right cornering light V4. Part (H) of FIG. 5 shows a state (performing a blink display or displaying nothing) of the display portion 15A2 or the display portion 15A3 of the visual alert part 15A. Part (I) of FIG. 5 shows a state (outputting an alarm sound or outputting nothing) of the auditory alert part 15B. Part (J) of FIG. 5 shows a state (displaying an image or displaying nothing) of the display portion 15A4 of the visual alert part 15A.

In the example shown in FIG. 5, similarly to the example shown in FIG. 4, the determination portion 13A of the control part 13 determines whether or not a determination period DP1 (refer to part (A) of FIG. 5) as a period in which the switch part 12 outputs the ON signal "Turn SW L ON" (refer to part (A) of FIG. 5) is equal to or more than a setting period SP1 (for example, 1000 [ms]) (refer to part (A) of FIG. 5).

When the determination period DP1 is equal to or more than the setting period SP1, the control part 13 performs a full turn control (a control shown in FIG. 5) that generates a turn signal (full turn signal) "Turn LT L" (refer to part (B) of FIG. 5) over the determination period DP1 (refer to part (A) of FIG. 5).

In the example shown in FIG. 5, at a time t31, the driver moves the operation part 11 to the hold position of the first position 11B. Accordingly, the switch part 12 starts outputting the ON signal "Turn SW L ON" (refer to part (A) of FIG. 5). Accordingly, the control part 13 starts generating a turn signal for a left turn "Turn LT L" in accordance with the first position 11B of the operation part 11 (refer to part (B) of FIG. 5). Accordingly, the left turn signal lamp V1 starts blinking (refer to part (E) of FIG. 5).

In the example shown in FIG. 5, at the time t31, since the camera 14A of the detection part 14 does not capture an image of another vehicle that is present in a left rear direction of the vehicle V, the left cornering light V3 is not turned on, the display portion 15A1 or the display portion 15A3 of the visual alert part 15A does not start performing a blink display, and the auditory alert part 15B does not start outputting an alarm sound.

On the other hand, in another example, at the time t31, when the camera 14A of the detection part 14 captures an image of another vehicle that is present in a left rear direction of the vehicle V, the left cornering light V3 is turned on, the display portion 15A1 or the display portion 15A3 of the visual alert part 15A starts performing a blink display, and the auditory alert part 15B starts outputting an alarm sound.

In the example shown in FIG. 5, next, at a time t32, the predetermined condition described above is satisfied, and the determination portion 13A of the control part 13 determines that the determination period DP1 (the time t31 to a time t33) in which the switch part 12 outputs the ON signal "Turn SW L ON" becomes equal to or more than the setting period SP1 (the time t31 to a time t32).

Next, at the time t33, the operation part 11 moves from the first position 11B to the neutral position 11A. Accordingly, the output from the switch part 12 is switched from the ON signal "Turn SW L ON" to the OFF signal "Turn SW L OFF" (refer to part (A) of FIG. 5). Accordingly, the control part 13 does not generate the turn signal for a left turn "Turn LT L" (refer to part (B) of FIG. 5). Accordingly, the left turn signal lamp V1 is turned off (refer to part (E) of FIG. 5).

That is, in the example shown in FIG. 5, the control part 13 continuously generates the turn signal for a left turn "Turn LT L" until the predetermined condition described above is satisfied (until the time t33).

Next, at a time t34, the driver of the vehicle V who intends to generate a turn signal (for example, a full turn signal) for a right turn "Turn LT R" (refer to part (B) of FIG. 5) moves the operation part 11 from the neutral position 11A to the second position 11C. That is, the driver performs, for example, a full turn operation for a right turn. Accordingly, the switch part 12 starts outputting the ON signal "Turn SW R ON" in accordance with the second position 11C of the operation part 11 (refer to part (C) of FIG. 5).

On the other hand, the control part 13 does not yet start generating a turn signal for a right turn "Turn LT R" in accordance with the second position 11C of the operation part 11 (refer to part (D) of FIG. 5). Therefore, the right turn signal lamp V2 does not yet start blinking (refer to part (F) of FIG. 5). Further, the right cornering light V4 is also not yet turned on (refer to part (G) of FIG. 5).

Further, at the time t34, when the camera 14B of the detection part 14 captures an image of another vehicle that is present in a right rear direction of the vehicle V, the display portion 15A2 or the display portion 15A3 of the visual alert part 15A starts performing a blink display (refer to part (H) of FIG. 5). On the other hand, even when the camera 14B of the detection part 14 captures an image of another vehicle that is present in a right rear direction of the vehicle V, the auditory alert part 15B does not yet start outputting an alarm sound (refer to part (I) of FIG. 5).

Further, at the time t34, the display portion 15A4 of the visual alert part 15A starts displaying an image of the right rear situation of the vehicle V that is captured by the camera 14B of the detection part 14 (refer to part (J) of FIG. 5).

Next, the determination portion 13A of the control part 13 determines whether or not the switch part 12 continues outputting the ON signal "Turn SW R ON" (refer to part (C) of FIG. 5) in accordance with the second position 11C of the operation part 11 in a determination period DP3 (a time t35 to a time t36) as a period after a time point (the time t35) when a setting period SP4 (the time t33 to the time t35) elapses from an end time point (the time t33) of the determination period DP1 (the time t31 to the time t33). In detail, the determination portion 13A determines that the switch part 12 continues outputting the ON signal "Turn SW R ON" (refer to part (C) of FIG. 5) in the determination period DP3. As a result, at the time t35, the control part 13 starts generating the turn signal for a right turn "Turn LT R" in accordance with the second position 11C of the operation part 11 (refer to part (D) of FIG. 5). Accordingly, the right turn signal lamp V2 starts blinking (refer to part (F) of FIG. 5). Further, the right cornering light V4 is turned on (refer to part (G) of FIG. 5).

Further, at the time t35, the auditory alert part 15B starts outputting an alarm sound (refer to part (I) of FIG. 5).

The display portion 15A2 or the display portion 15A3 of the visual alert part 15A continues performing a blink display (refer to part (H) of FIG. 5), and the display portion 15A4 of the visual alert part 15A continues displaying an image of the right rear situation of the vehicle V that is captured by the camera 14B of the detection part 14 (refer to part (J) of FIG. 5).

In another example, a timing at which the right cornering light V4 is turned on and/or a timing at which the auditory alert part 15B starts outputting an alarm sound may be different from the time t35, for example, by an amount of time lag.

In the example shown in FIG. 5, next, at the time t36, the operation part 11 returns to the neutral position 11A.

Accordingly, the output from the switch part 12 is switched from the ON signal "Turn SW R ON" to the OFF signal "Turn SW R OFF" (refer to part (C) of FIG. 5). Accordingly, the control part 13 does not generate the turn signal for a right turn "Turn LT R" (refer to part (D) of FIG. 5). Accordingly, the right turn signal lamp V2 is turned off (refer to part (F) of FIG. 5). Further, the right cornering light V4 is also turned off (refer to part (G) of FIG. 5).

Further, at the time t36, the display portion 15A2 or the display portion 15A3 of the visual alert part 15A ends a blink display (refer to part (H) of FIG. 5), and the auditory alert part 15B ends outputting an alarm sound (refer to part (I) of FIG. 5).

Further, at the time t36, the display portion 15A4 of the visual alert part 15A ends displaying an image of the right rear situation of the vehicle V that is captured by the camera 14B of the detection part 14 (refer to part (J) of FIG. 5).

That is, in the example shown in FIG. 5, in a case where the switch part 12 outputs the ON signal "Turn SW R ON" (refer to part (C) of FIG. 5) in accordance with the second position 11C of the operation part 11 after the control part 13 generates a turn signal for a left turn "Turn LT L" (refer to part (B) of FIG. 5) in accordance with the first position 11B of the operation part 11 over the determination period DP1 (the time t31 to the time t33), the determination portion 13A determines whether or not the switch part 12 continues outputting the ON signal "Turn SW R ON" in accordance with the second position 11C of the operation part 11 in the determination period DP3 as a period after the time point (the time t35) when the setting period SP4 (the time t33 to the time t35) elapses from the end time point (the time t33) of the determination period DP1.

In the example shown in FIG. 5, since the switch part 12 continues outputting the ON signal "Turn SW R ON" in accordance with the second position 11C of the operation part 11 in the determination period DP3, at the time t35, the control part 13 starts generating the turn signal for a right turn "Turn LT R" in accordance with the second position 11C of the operation part 11.

In a case where the switch part 12 continues outputting the ON signal "Turn SW R ON" (refer to part (C) of FIG. 5) in the determination period DP3 (after the time t35), that is, in a case where the output of the ON signal "Turn SW R ON" occurs after the setting period SP4 (the time t33 to the time t35) elapses, it can be estimated not that the operation part 11 is positioned at the second position 11C due to an erroneous operation of the driver of the vehicle V but that the driver of the vehicle V intends to generate the turn signal for a right turn "Turn LT R" (refer to part (D) of FIG. 5).

Therefore, in the example shown in FIG. 5, as described above, in a case where the switch part 12 continues outputting the ON signal "Turn SW R ON" in the determination period DP3, that is, in a case where the output of the ON signal "Turn SW R ON" occurs after the setting period SP4 (the time t33 to the time t35) elapses, the control part 13 generates the turn signal for a right turn "Turn LT R". Therefore, it is possible to satisfy the request of the driver of the vehicle V who intends to generate the turn signal for a right turn "Turn LT R".

Further, in the example shown in FIG. 5, in a case where the switch part 12 continues outputting the ON signal "Turn SW R ON" in the determination period DP3, that is, in a case where the output of the ON signal "Turn SW R ON" occurs after the setting period SP4 (the time t33 to the time t35) elapses, the auditory alert part 15B performs an auditory alert based on the output of the ON signal "Turn SW R ON" (refer to part (C) of FIG. 5) in accordance with the second position 11C of the operation part 11 and the detection result (an image of another vehicle that is present in a right rear direction of the vehicle V) of the camera 14B of the detection part 14.

Therefore, it is possible to improve the safety compared to a case where the alert by the alert part 15 is not performed.

In the example shown in FIG. 5, at the time t35, the tactile alert part 15C does not perform a tactile alert; however, in another example, at the time t35, the tactile alert part 15C may perform a tactile alert.

Further, in the example shown in FIG. 5, in a case where the switch part 12 continues outputting the ON signal "Turn SW R ON" in the determination period DP3, that is, in a case where the output of the ON signal "Turn SW R ON" occurs after the setting period SP4 (the time t33 to the time t35) elapses, the control part 13 generates a signal that operates the right cornering light V4 which corresponds to the turn signal for a right turn "Turn LT R" (refer to part (D) of FIG. 5), and accordingly, the right cornering light V4 is turned on.

Therefore, it is possible to improve the safety compared to a case where the right cornering light V4 is not turned on at the time t35.

In the example shown in FIG. 5, at the time t34, the driver moves the operation part 11 to the second position 11C only once; however, in another example, in the setting period SP4 (the time t33 to the time t35), the driver moves the operation part 11 twice. In detail, in the setting period SP4, after being operated to return to the neutral position 11A, the operation part 11 is operated to the second position 11C again. As a result, in this example, the control part 13 generates a turn signal for a right turn "Turn LT R" before the setting period SP4 elapses (at or before the time t35). Further, in a case where the camera 14B of the detection part 14 captures an image of another vehicle that is present in a right rear direction of the vehicle V before the setting period SP4 elapses (at or before the time t35), the auditory alert part 15B starts outputting an alarm sound based on the output of the ON signal "Turn SW R ON".

The determination period DP1, the determination period DP2, the determination period DP3, the setting period SP1, the setting period SP2, the setting period SP3, and/or the setting period SP4 described above are changeable by a setting. In another example, the periods may be changed depending on a parameter such as a vehicle speed.

In the example described above, the lane change signal and the full turn signal are not distinguished; however, in another example, the lane change signal and the full turn signal may be distinguished, for example, like a technique described in Japanese Patent Application, Publication No. 2016-43805A.

In the blind spot information function in the example described above, a control that turns on the light when another vehicle is present at the blind angle of the driver is not performed; however, in another example, in the blind spot information function, a control that turns on the light when another vehicle is present at the blind angle of the driver may be performed.

In the blind spot information function in the example described above, a control that allows the light to blink when the driver performs a turn lever operation of the operation part 11 is not performed; however, in another example, in the blind spot information function, a control that allows the light to blink when the driver performs a turn lever operation of the operation part 11 may be performed.

In the example described above, the blind spot information function is not turned off by customization; however, in another example, the blind spot information function may be turned off by customization.

Figure 6:
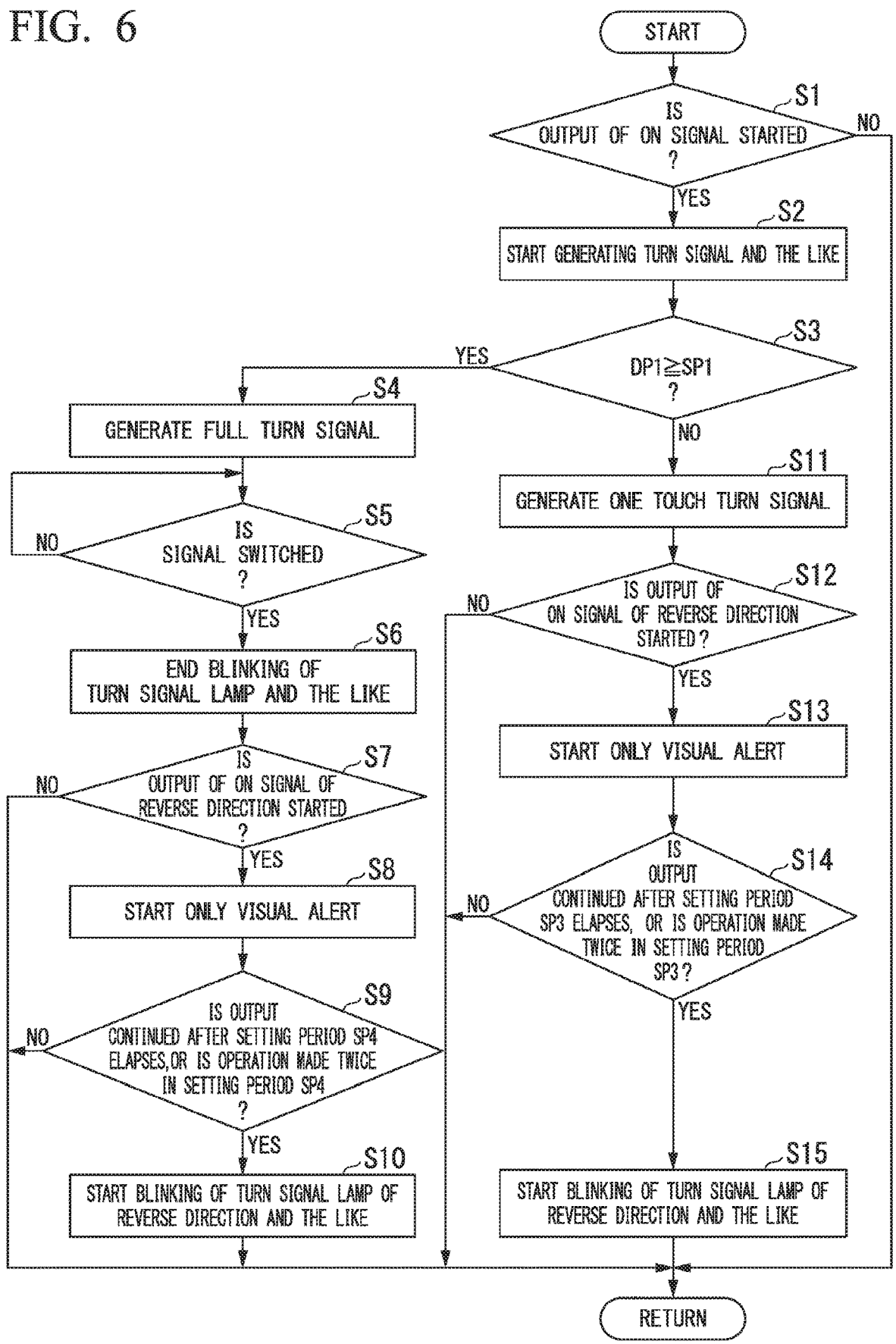
FIG. 6 is a flowchart showing an example of a process that is executed in the vehicle drive assist system of the first embodiment that includes an alternate operation part.

FIG. 6 is a flowchart showing an example of a process that is executed in the vehicle drive assist system 1 of the first embodiment that includes an alternate operation part 11.

In the example shown in FIG. 6, in Step S1, for example, the control part 13 determines whether or not the output of the ON signal from the switch part 12 is started. When the output of the ON signal from the switch part 12 is started, the routine proceeds to Step S2. On the other hand, when the output of the ON signal from the switch part 12 is not started, the process shown in FIG. 6 is finished.

In Step S2, the control part 13 starts generating a turn signal. In detail, in Step S2, the turn signal lamp starts blinking, and in response to the detection result of the detection part 14, the visual alert part 15A and the auditory alert part 15B start an alert, and the cornering light starts lighting.

Next, in Step S3, the determination portion 13A determines whether or not the determination period DP1 described above is equal to or more than the setting period SP1 described above. When the determination period DP1 is equal to or more than the setting period SP1, the routine proceeds to Step S4. On the other hand, when the determination period DP1 is less than the setting period SP1, the routine proceeds to Step S11.

In Step S4, the control part 13 generates a full turn signal.

Next, in Step S5, for example, the control part 13 determines whether or not the output from the switch part 12 is switched from an ON signal to an OFF signal. When the output from the switch part 12 is switched from the ON signal to the OFF signal, the routine proceeds to Step S6. On the other hand, when the output from the switch part 12 is not switched from the ON signal to the OFF signal, Step S5 is repeated.

In Step S6, the turn signal lamp ends blinking. When the visual alert part 15A and the auditory alert part 15B perform an alert in or before Step S6, the visual alert part 15A and the auditory alert part 15B stop the alert. Further, when the cornering light is lighting in or before Step S6, the cornering light is turned off.

Next, in Step S7, for example, the control part 13 determines whether or not the output of an ON signal of a reverse direction from the switch part 12 is started in a predetermined period of time. When the output of the ON signal of the reverse direction from the switch part 12 is started in the predetermined period of time, the routine proceeds to Step S8. On the other hand, when the output of the ON signal of the reverse direction from the switch part 12 is not started in the predetermined period of time, the process shown in FIG. 6 is finished.

In Step S8, only the visual alert part 15A starts an alert in response to the detection result of the detection part 14.

Next, in Step S9, for example, the control part 13 determines whether or not the switch part 12 continues outputting the ON signal of the reverse direction in the determination period DP3 after the setting period SP4 elapses, or whether or not the driver moves the operation part 11 twice in the setting period SP4. When the switch part 12 continues outputting the ON signal of the reverse direction in the determination period DP3 after the setting period SP4 elapses, or when the driver moves the operation part 11 twice in the setting period SP4, the routine proceeds to Step S10. On the other hand, when the switch part 12 does not output the ON signal of the reverse direction in the determination period DP3 after the setting period SP4 elapses, and the driver does not move the operation part 11 twice in the setting period SP4, the process shown in FIG. 6 is finished.

In Step S10, the turn signal lamp of the reverse direction starts blinking, and in response to the detection result of the detection part 14, the auditory alert part 15B starts an alert, and the cornering light of the reverse direction starts lighting.

In Step S11, the control part 13 generates a one touch turn signal, and the turn signal lamp blinks only three times. In the blinking of the turn signal lamp, in response to the detection result of the detection part 14, the visual alert part 15A and the auditory alert part 15B perform an alert, and the cornering light is lighted.

Next, in Step S12, for example, the control part 13 determines whether or not the output of an ON signal of a reverse direction from the switch part 12 is started in the blinking of the turn signal lamp described above or in a predetermined period of time after the blinking of the turn signal lamp described above. When the output of the ON signal of the reverse direction from the switch part 12 is started, the routine proceeds to Step S13. On the other hand, when the output of the ON signal of the reverse direction from the switch part 12 is not started, the process shown in FIG. 6 is finished.

In Step S13, only the visual alert part 15A starts an alert in response to the detection result of the detection part 14.

Next, in Step S14, for example, the control part 13 determines whether or not the switch part 12 continues outputting the ON signal of the reverse direction in the determination period DP2 after the setting period SP3 elapses, or whether or not the driver moves the operation part 11 twice in the setting period SP3. When the switch part 12 continues outputting the ON signal of the reverse direction in the determination period DP2 after the setting period SP3 elapses, or when the driver moves the operation part 11 twice in the setting period SP3, the routine proceeds to Step S15. On the other hand, when the switch part 12 does not output the ON signal of the reverse direction in the determination period DP2 after the setting period SP3 elapses, and the driver does not move the operation part 11 twice in the setting period SP3, the process shown in FIG. 6 is finished.

In Step S15, the turn signal lamp of the reverse direction starts blinking, and in response to the detection result of the detection part 14, the auditory alert part 15B starts an alert, and the cornering light of the reverse direction starts lighting.

Figure 7:
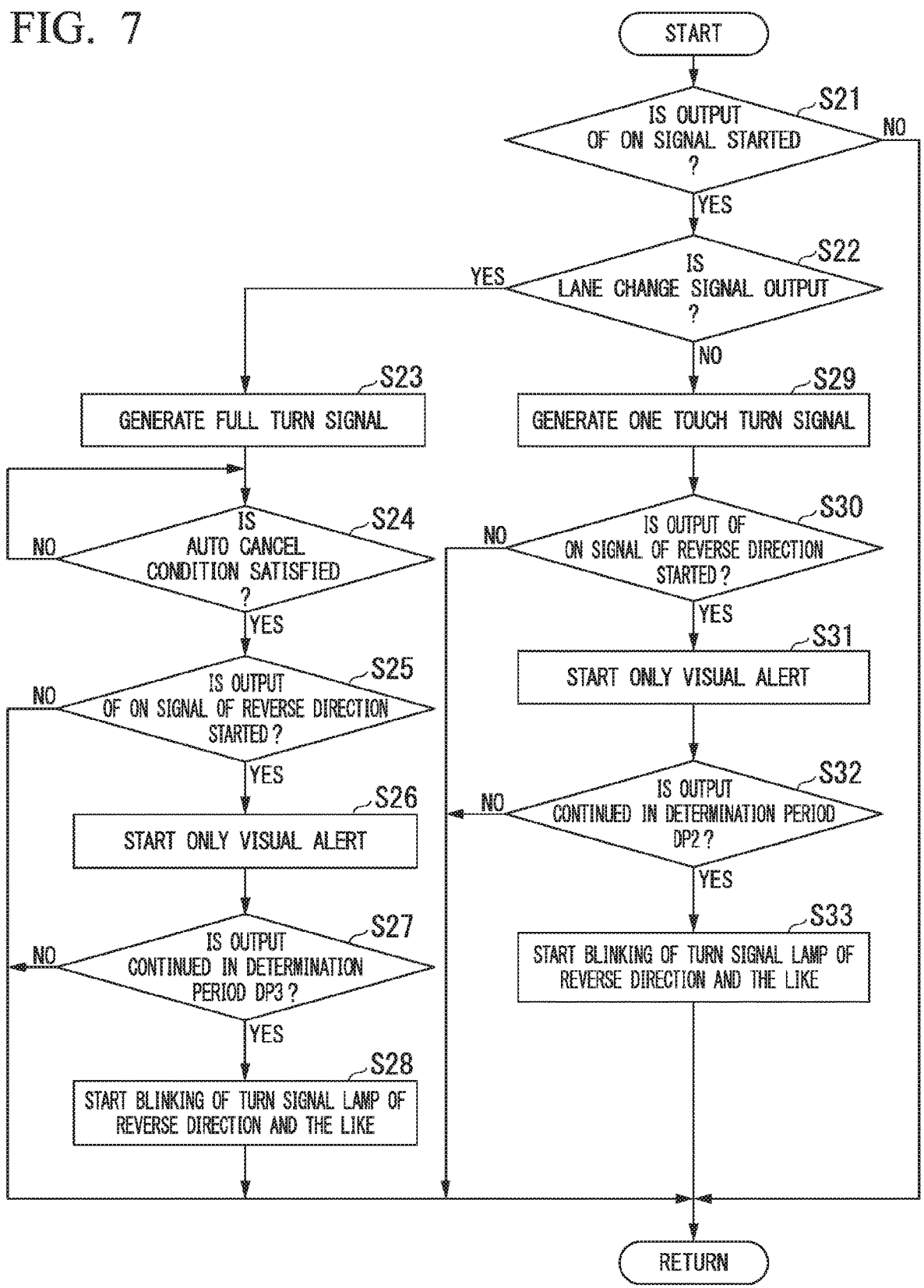
FIG. 7 is a flowchart showing an example of a process that is executed in the vehicle drive assist system of the first embodiment that includes a momentary operation part.

FIG. 7 is a flowchart showing an example of a process that is executed in the vehicle drive assist system 1 of the first embodiment that includes a momentary operation part 11.

In the example shown in FIG. 7, in Step S21, for example, the control part 13 determines whether or not the output of an ON signal of a one touch turn from the switch part 12 is started. When the output of the ON signal of the one touch turn from the switch part 12 is started, the routine proceeds to Step S22. On the other hand, when the output of the ON signal of the one touch turn from the switch part 12 is not started, the process shown in FIG. 7 is finished.

In Step S22, for example, the control part 13 determines whether or not the switch part 12 outputs a lane change signal. When the switch part 12 outputs the lane change signal, the routine proceeds to Step S23. On the other hand, when the switch part 12 does not output the lane change signal, the routine proceeds to Step S29.

In Step S23, the control part 13 generates a full turn signal. In detail, in Step S23, the turn signal lamp blinks, and in response to the detection result of the detection part 14, the visual alert part 15A and the auditory alert part 15B perform an alert, and the cornering light is lighted.

Next, in Step S24, for example, the control part 13 determines whether or not an auto cancel condition is satisfied. When the auto cancel condition is satisfied, the turn signal lamp ends blinking. When the visual alert part 15A and the auditory alert part 15B perform an alert in or before Step S24, the visual alert part 15A and the auditory alert part 15B stop the alert. Further, when the cornering light is lighting in or before Step S24, the cornering light is turned off. Then, the routine proceeds to Step S25. On the other hand, when the auto cancel condition is not satisfied, Step S24 is repeated.

In Step S25, for example, the control part 13 determines whether or not the output of an ON signal of a reverse direction from the switch part 12 is started in a predetermined period of time. When the output of the ON signal of the reverse direction from the switch part 12 is started in the predetermined period of time, the routine proceeds to Step S26. On the other hand, when the output of the ON signal of the reverse direction from the switch part 12 is not started in the predetermined period of time, the process shown in FIG. 7 is finished.

In Step S26, only the visual alert part 15A starts an alert in response to the detection result of the detection part 14.

Next, in Step S27, for example, the control part 13 determines whether or not the switch part 12 continues outputting the ON signal of the reverse direction in the determination period DP3 after the setting period SP4 elapses. When the switch part 12 continues outputting the ON signal of the reverse direction in the determination period DP3 after the setting period SP4 elapses, the routine proceeds to Step S28. On the other hand, when the switch part 12 does not output the ON signal of the reverse direction in the determination period DP3 after the setting period SP4 elapses, the process shown in FIG. 7 is finished.

In Step S28, the turn signal lamp of the reverse direction starts blinking, and in response to the detection result of the detection part 14, the auditory alert part 15B starts an alert, and the cornering light of the reverse direction starts lighting.

In Step S29, the control part 13 generates a one touch turn signal, and the turn signal lamp blinks only three times. In the blinking of the turn signal lamp, in response to the detection result of the detection part 14, the visual alert part 15A and the auditory alert part 15B perform an alert, and the cornering light is lighted.

Next, in Step S30, for example, the control part 13 determines whether or not the output of an ON signal of a reverse direction from the switch part 12 is started in the blinking of the turn signal lamp described above or in a predetermined period of time after the blinking of the turn signal lamp described above. When the output of the ON signal of the reverse direction from the switch part 12 is started, the routine proceeds to Step S31. On the other hand, when the output of the ON signal of the reverse direction from the switch part 12 is not started, the process shown in FIG. 7 is finished.

In Step S31, only the visual alert part 15A starts an alert in response to the detection result of the detection part 14.

Next, in Step S32, for example, the control part 13 determines whether or not the switch part 12 continues outputting the ON signal of the reverse direction in the determination period DP2 after the setting period SP3 elapses. When the switch part 12 continues outputting the ON signal of the reverse direction in the determination period DP2 after the setting period SP3 elapses, the routine proceeds to Step S33. On the other hand, when the switch part 12 does not output the ON signal of the reverse direction in the determination period DP2 after the setting period SP3 elapses, the process shown in FIG. 7 is finished.

In Step S33, the turn signal lamp of the reverse direction starts blinking, and in response to the detection result of the detection part 14, the auditory alert part 15B starts an alert, and the cornering light of the reverse direction starts lighting.

In the vehicle drive assist system 1 of the first embodiment described above, the control part 13 performs both the first control and the second control described above; however, in a vehicle drive assist system 1 of a second embodiment, the control part 13 performs only the first control. In a vehicle drive assist system 1 of a third embodiment, the control part 13 performs only the second control.

The embodiments of the present invention are described as an example, but the invention is not limited to the embodiments. The embodiments can be implemented as a variety of other embodiments, and a variety of omissions, replacements, and changes can be made without departing from the scope of the invention. The embodiments and modifications of the embodiments are included in the scope of the invention and also included in the invention described in the claims and equivalents thereof.

What is claimed is:

1. A vehicle drive assist system, comprising:
an operation part that is provided operable from a neutral position to a first position at one side and a second position at another side and that returns to the neutral position after being operated or after a predetermined condition is satisfied;

a switch part that outputs any one of an ON signal and an OFF signal in accordance with a position of the operation part;
a processor that executes instructions to: generate a turn signal in response to an output of the switch part;
a detection part that detects a rear side situation of a vehicle; and
an alert part that performs an alert based on an output of the ON signal of the switch part and a detection result of the detection part,
wherein the alert part comprises
a visual alert part, and
an auditory alert part and/or a tactile alert part,
the processor further executes instructions to: perform at least one of a one touch turn control that generates a turn signal over a first setting period and a full turn control that continuously generates a turn signal until the predetermined condition is satisfied, and
at least one of:
a first control in which, in a case where the switch part outputs the ON signal in accordance with the second position in the one touch turn control in accordance with the first position, the processor further executes instructions to: not generate the turn signal in accordance with the second position and cancels the one touch turn control in accordance with the first position, and only the visual alert part of the alert part performs a visual alert based on the output of the ON signal in accordance with the second position and the detection result of the detection part; and
a second control in which, in a case where the switch part outputs the ON signal in accordance with the second position when or after the processor further executes instructions to: generate, a full turn signal in accordance with the first position, the processor further executes instructions to: not generate the turn signal in accordance with the second position and cancels the full turn control in accordance with the first position, and only the visual alert part of the alert part performs a visual alert based on the output of the ON signal in accordance with the second position and the detection result of the detection part
is performed.

2. The vehicle drive assist system according to claim 1, wherein the visual alert part comprises a first display portion that is provided on a side mirror of the vehicle and/or a second display portion that is provided at a position away from a vehicle width direction position of a steering.

3. The vehicle drive assist system according to claim 1, wherein the processor further executes instructions to: set a second setting period when the first control is started, and
in a case where the output of the ON signal in accordance with the second position continues after the second setting period elapses,
the processor further executes instructions to: generate the turn signal in accordance with the second position, and
the auditory alert part and/or the tactile alert part perform an auditory and/or tactile alert based on the output of the ON signal in accordance with the second position and the detection result of the detection part.

4. The vehicle drive assist system according to claim 3, wherein in a case where, in the second setting period, after being operated to return to the neutral position, the operation part is operated to the second position again, the first control generates the turn signal in accordance with the second position before the second setting period elapses and allows the auditory alert part and/or the tactile alert part to perform an auditory and/or tactile alert based on the output of the ON signal in accordance with the second position of the operation part and the detection result of the detection part.

5. The vehicle drive assist system according to claim 3, wherein in a case where the output of the ON signal in accordance with the second position continues after the second setting period elapses,
the processor further executes instructions to: generate a signal that operates a cornering light to emit light in a side direction which corresponds to the turn signal in accordance with the second position among right and left side directions of the vehicle.

6. The vehicle drive assist system according to claim 1, wherein the processor further executes instructions to: set a third setting period when the second control is started, and
in a case where the output of the ON signal in accordance with the second position occurs after the third setting period elapses,
the processor further executes instructions to: generate the turn signal in accordance with the second position, and
the auditory alert part and/or the tactile alert part perform an auditory and/or tactile alert based on the output of the ON signal in accordance with the second position and the detection result of the detection part.

7. The vehicle drive assist system according to claim 6, wherein in a case where, in the third setting period, after being operated to return to the neutral position, the operation part is operated to the second position again, the second control generates the turn signal in accordance with the second position before the third setting period elapses and allows the auditory alert part and/or the tactile alert part to perform an auditory and/or tactile alert based on the output of the ON signal in accordance with the second position of the operation part and the detection result of the detection part.

8. The vehicle drive assist system according to claim 6, wherein in a case where the output of the ON signal in accordance with the second position continues after the third setting period elapses,
the processor further executes instructions to: generate a signal that operates a cornering light to emit light in a side direction which corresponds to the turn signal in accordance with the second position among right and left side directions of the vehicle.

* * * * *